(12) United States Patent
Ren et al.

(10) Patent No.: US 12,169,677 B2
(45) Date of Patent: Dec. 17, 2024

(54) STANDARD CELL LAYOUT GENERATION WITH APPLIED ARTIFICIAL INTELLIGENCE

(71) Applicant: NVIDIA Corp., Santa Clara, CA (US)

(72) Inventors: Haoxing Ren, Austin, TX (US); Matthew Rudolph Fojtik, Chapel Hill, NC (US)

(73) Assignee: NVIDIA Corp., Santa Clara, CA (US)

( * ) Notice: Subject to any disclaimer, the term of this patent is extended or adjusted under 35 U.S.C. 154(b) by 649 days.

(21) Appl. No.: 17/230,592

(22) Filed: Apr. 14, 2021

(65) Prior Publication Data

US 2022/0027546 A1   Jan. 27, 2022

Related U.S. Application Data

(60) Provisional application No. 63/090,037, filed on Oct. 9, 2020, provisional application No. 63/055,753, filed on Jul. 23, 2020.

(51) Int. Cl.
| | |
|---|---|
| *G06F 30/398* | (2020.01) |
| *G06F 30/394* | (2020.01) |
| *G06N 3/047* | (2023.01) |
| *G06N 3/12* | (2023.01) |

(52) U.S. Cl.
CPC .......... *G06F 30/398* (2020.01); *G06F 30/394* (2020.01); *G06N 3/047* (2023.01); *G06N 3/12* (2013.01)

(58) Field of Classification Search
CPC .. G06F 30/398; G06F 30/394; G06F 2111/20; G06F 30/27; G06F 30/39; G06F 30/392; G06F 2111/04; G06N 3/047; G06N 3/12; G06N 3/045; G06N 3/08; G06N 5/025; G06N 3/126; G06N 5/01; G06N 20/00; H04L 45/14
See application file for complete search history.

(56) References Cited

U.S. PATENT DOCUMENTS

| | | | |
|---|---|---|---|
| 10,581,645 B1 | 3/2020 | Song et al. | |
| 10,657,306 B1 | 5/2020 | Ma et al. | |
| 10,747,936 B1 * | 8/2020 | Luo | ........................ G06F 30/394 |
| 10,755,026 B1 * | 8/2020 | Luo | ........................ G06N 3/045 |
| 10,949,596 B1 * | 3/2021 | Zhang | ........................ G06F 7/24 |
| 11,093,681 B2 * | 8/2021 | Lin | ........................ G06F 30/396 |
| 11,194,949 B1 * | 12/2021 | Saxena | ............... G06F 30/3953 |
| 11,636,388 B1 * | 4/2023 | Chan | ........................ G06N 20/00 |
| | | | 716/129 |
| 2018/0268096 A1* | 9/2018 | Chuang | ................. G06F 30/337 |

(Continued)

OTHER PUBLICATIONS

Ang Lu, 2015 Design, Automation and Test in Europe Conference & Exhibition; pp. 1647-1652.

(Continued)

*Primary Examiner* — Nha T Nguyen
(74) *Attorney, Agent, or Firm* — Rowan TELS LLC

(57) ABSTRACT

A genetic algorithm is utilized to generate routing candidates to which a reinforcement learning model is applied to correct the design rule constraint violations incrementally. A design rule checker provides feedback on the violations to the reinforcement learning model and the model learns how to fix the violations. A layout device placer based upon a simulated annealing method may also be utilized.

18 Claims, 14 Drawing Sheets

(56) References Cited

U.S. PATENT DOCUMENTS

| | | | |
|---|---|---|---|
| 2018/0307790 A1* | 10/2018 | Chuang | G06N 3/08 |
| 2019/0163978 A1 | 5/2019 | Yang et al. | |
| 2019/0188569 A1 | 6/2019 | Naumov | |
| 2019/0213775 A1 | 7/2019 | Dimitrov et al. | |
| 2019/0370432 A1* | 12/2019 | Sha | G06F 30/392 |
| 2020/0043228 A1 | 2/2020 | Patrick et al. | |
| 2020/0104457 A1* | 4/2020 | Chuang | G06F 30/327 |
| 2020/0151289 A1 | 5/2020 | Sikka et al. | |
| 2020/0151571 A1 | 5/2020 | Wu | |
| 2020/0151615 A1* | 5/2020 | Krishnan | G06N 20/00 |
| 2020/0175216 A1* | 6/2020 | Ho | G06N 3/045 |
| 2020/0175392 A1 | 6/2020 | Tang et al. | |
| 2020/0210276 A1 | 7/2020 | Sullivan et al. | |
| 2021/0334445 A1* | 10/2021 | Goldie | G06F 30/392 |
| 2021/0342516 A1* | 11/2021 | Ren | G06F 30/27 |
| 2022/0083703 A1* | 3/2022 | Wang | G06N 20/00 |
| 2023/0076185 A1* | 3/2023 | Larranaga | G05B 19/41875 |
| 2023/0124106 A1* | 4/2023 | Hubaux | G03F 7/705 700/29 |
| 2023/0259689 A1* | 8/2023 | Xu | G06F 30/392 716/111 |

OTHER PUBLICATIONS

Cleef; IEEE Transactions on Computer-Aided Design of Integrated Circuits and Systems, vol. 39, No. 10, Oct. 2020 pp. 2872 to 2885.

Shmuel Wimer IEEE Transactions on Computer-Aided Design, vol. CAD-6, No. 5, Sep. 1987.

Yih-Lang Li; Conference Paper NCTUcell: A DDA-Aware Cell Library Generator for FinFET Structure with Implicitly Adjustable Grid Map · Jun. 2019.

* cited by examiner

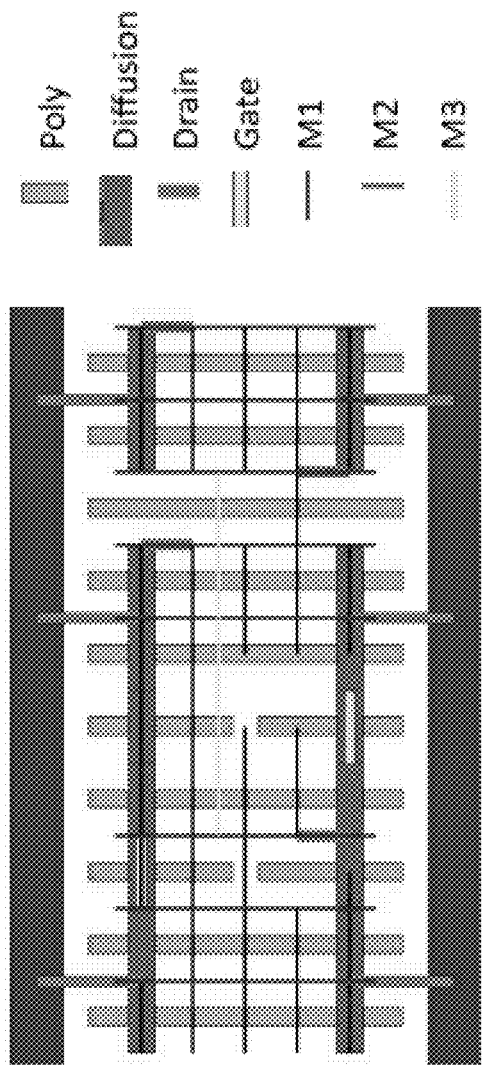
FIG. 1A
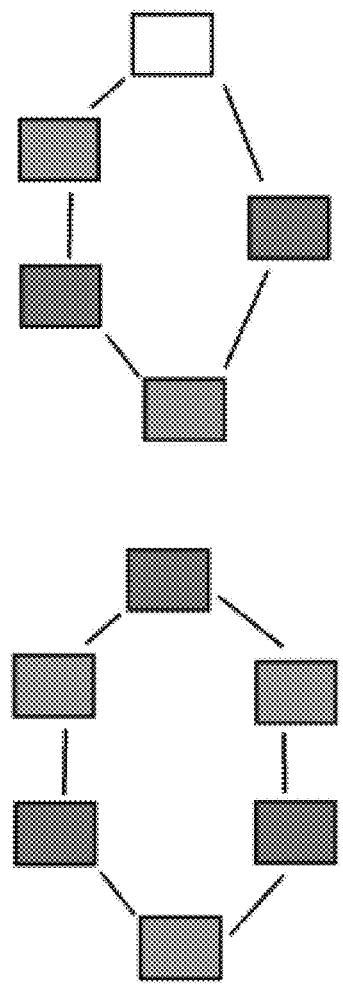
FIG. 1B
FIG. 1C

Input: nets $N$, net terminals $T_n$, generations $G$, population $K$
Output: DRC free routing candidates $\mathbb{R}$ 1: create the terminal pair set $\mathbb{P}$
2: Maze route initial routing candidates $\{\mathbb{R}_1, ..., \mathbb{R}_k\}$ for the first generation with random order
3: for $g \leftarrow 1$ to $G$ do
4:   for $i \leftarrow 1$ to $K$ do
5:     select $\mathbb{R}_{dad}$ and $\mathbb{R}_{mom}$ from $\{\mathbb{R}_1, ..., \mathbb{R}_k\}$
6:     $\mathbb{R}'_i \leftarrow crossover(\mathbb{R}_{dad}, \mathbb{R}_{mom})$
7:     $\mathbb{R}'_i \leftarrow mutate(\mathbb{R}'_i)$
8:     $\mathbb{R}'_i \leftarrow$ Maze route unrouted pairs with random order
9:     run RL DRC fixer on route $\mathbb{R}'_i$
10:     $DRC(\mathbb{R}'_i) \leftarrow$ remaining DRCs
11:     if $DRC(\mathbb{R}'_i) == 0$ then
12:       return $\mathbb{R}'_i$
13: $\{\mathbb{R}_1, ..., \mathbb{R}_k\} \leftarrow$ Top $K$ fitness from $\{\mathbb{R}'_1, ..., \mathbb{R}'_k, \mathbb{R}_1, ..., \mathbb{R}_k\}$

FIG. 6

STANDARD CELL LAYOUT GENERATION WITH APPLIED ARTIFICIAL INTELLIGENCE

CROSS-REFERENCE TO RELATED APPLICATIONS

This application claims priority and benefit under 35 USC 119(e) to U.S. application No. 63/055,753, filed on Jul. 23, 2020, titled "Standard Cell Routing with Reinforcement Learning and Genetic Algorithm in Advanced Technology Nodes" and to U.S. application No. 63/090,037, filed on Oct. 9, 2020, titled "Generate Standard Cell Layout in Advanced Technology Nodes with Reinforcement Learning", the contents of each being hereby incorporated by reference in their entirety.

BACKGROUND

A technology node is a specific semiconductor manufacturing process and its design rules. Generating logic cell layouts in advanced technology nodes is challenging due in part to the exploding number and complexity of design rule constraints (DRCs), especially when the design goal is to minimize cell area. Different technology nodes often utilize different circuit generations and architectures in cell libraries. Generally, the more advanced the technology node, the smaller the feature size, producing smaller transistors which are both faster and more power-efficient.

Previous approaches to cell generating layouts in advanced technology nodes leverage mathematical optimization methods such as Satisfiability Problem (SAT) and Mixed Integer Programming (MILP) to identify solutions under those constraints. These mathematical optimization methods rely on manual expression of design rules within an optimization framework and computational solvers.

Certain logic cells, called "standard cells", are utilized as building blocks for advanced technology node layouts. Such layouts may be constructed from a very large number of instances of standard cells. Semiconductor companies and intellectual property providers may have teams dedicated to designing standard cell libraries for technology nodes. Each library may include thousands of standard cells. One cell design objective is minimizing cell width (cell height may be fixed within each library) to improve area efficiency.

Today most industrial standard cell designs are performed manually. Automating standard cell layout may not only speed up the design process, but also enable Design and Technology Co-Optimization (DTCO), which simultaneously optimizes standard cells and chip designs to achieve better performance.

Standard cell layout design automation includes two primary operations: placement and routing. Placement locates devices and assigns pin locations in the layout. Routing connects device terminals and pins based on net connectivity. Routing tends to be the more challenging of the two operations because routing needs to satisfy a (usually very large) set of configured DRCs.

In advanced technology nodes, not only do the number of DRCs greatly expand, but the DRCs are tend to more complex. Much of the new complexity comes from DRCs that involve multiple layout shapes that were previously independent of each other. Mathematical optimization approaches based on SAT and MILP depend on the assumption that all design rule constraints can be expressed in the forms such as conjunctive normal form for SAT, or linear inequality for MILP. It is challenging or impossible to express all the DRCs efficiently in these forms. A large number of constraints are needed to handle all DRCs, which makes it difficult to scale to larger designs. Furthermore, it is often necessary to reformulate these constraints by hand for every new technology node or standard cell layout template.

Prior placement techniques include heuristic based methods, exhaustive search based methods, and mathematical programming based methods. The heuristic based methods first find all possible chains in the circuit, i.e. devices that can share diffusions consecutively, and then select a number of chains that cover all the devices. The exhaustive search based methods go through all possible device placement configurations and might use branch and bound or dynamic programming techniques to speed up the search process. The mathematical programming-based methods leverage MILP or SAT algorithms to find optimal device placement. It has been shown that these placement techniques can generate good placement solutions.

Prior routing techniques include channel routing, SAT, and MILP based routing methods. Commonly used deterministic channel routing methods such as LEA, Dogleg, Greedy, YACR2, etc., only generate a particular routing solution and do not handle DRCs well. SAT based routing creates candidate routes for each terminal pair and leverages SAT to find feasible routing candidates for all terminal pairs. It requires DRC checks to prune all conflicting routing candidates. The quality of routing candidates also limits the final routing quality. Therefore these techniques often cannot find routing solutions for complicated cells.

MILP based routing methods formulate the routing problem as a mixed integer linear programming problem. These method, however, rely on a MILP solver to solve a large number of constraints and require DRCs to be expressed in conditional equality or inequality form. This makes supporting newer technology nodes difficult. One conventional approach uses a combination of MILP and rip-up-reroute techniques to route, which would have similar issues to those mentioned previously.

One conventional approach that utilizes reinforced learning for routing problems creates routing direction actions, i.e., going north, south, etc. at each step. Another uses the attention model-based REINFORCE algorithm to select routing orders and uses a pattern router to generate actual routes once a routing order is determined. Yet another leverages both Monte Carlo Tree Search (MCTS) and deep neural network based directional action to find routes. Most of these approaches are limited to connecting the routes without consideration of design rule violations. These approaches are not readily extended to handle DRCs for complex circuits and/or standard cell routing domains.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A depicts a stick diagram for an embodiment of a standard latch cell.

FIG. 1B depicts a DRC-conformant metal layout for double patterning.

FIG. 1C depicts a DRC-violating metal layout for double patterning.

FIG. 6 depicts a genetic routing algorithm 600 in accordance with one embodiment.

DETAILED DESCRIPTION

Figure 2A:
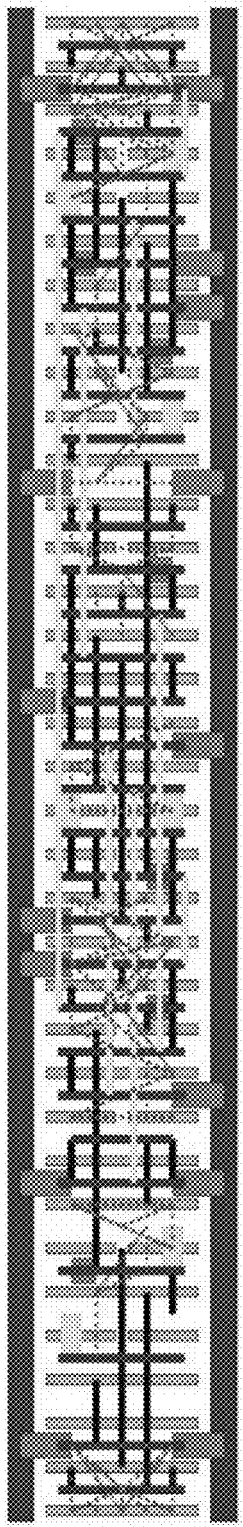
FIG. 2A depicts an exemplary routed layout generated by a DRC configured genetic algorithm.

Techniques are disclosed to apply reinforcement learning (RL) in a manner that obviates explicit formulation of DRCs during circuit routing. Constraints are enforced by a reward given in an environment in which DRC analysis is executed independently from routing optimization. Conventional approaches seek to apply reinforcement learning to the routing problem directly, i.e., to cause a reinforcement learning agent to generate routing actions for each wire, where the action space is a routing action (North, South, West, East) for each net of a layout. Instead of making the RL agent learn the job of a maze router, the disclosed techniques learn how to fix DRCs on existing routes. The routing problem is decomposed into two independent steps: routing and DRC fixing. The DRC fixing is configured through reinforced learning and scales to large designs, because DRC problems tend to be local, while routing may utilize global information, especially for long routes.

In one embodiment, an automated layout generator comprises a simulated annealing based algorithm for device placement and pin assignment. Device pairing and placement may be performed concurrently. A genetic algorithm based routing flow is utilized to identify minimum routes and reduce the likelihood of DRC errors. Reinforcement learning is applied to fix DRC errors in the generated routes. Trained on one standard cell, the resulting model may be transferable to others. The model may be further retrained on each cell to improve the results.

In some embodiments, routing may be carried out in two steps: (1) a genetic algorithm-based routing step, and (2) a RL-based DRC fixing step. The genetic algorithm drives a maze router to create a routing candidate set, and the DRC RL agent reduces the number of DRCs of a given routing candidate. The DRC RL agent may for example fix M1 layer DRC errors, and may in some embodiments focus solely on errors in this layer. M1 is the lowest routing layer that typically comprises the most difficult DRC issues. Other DRC errors may be corrected during maze routing. The RL 'game' may be configured to incrementally add additional M1 routing segments in order to reduce M1 DRCs. The observation space of the game may include the routes in M1, the DRC positions, and routing mask.

The action space may be set to be the M1 grid to be routed in a next iteration. The rewards for the game may be configured to include a small negative reward given at each step and a large positive reward associated with DRC reduction. A Proximal Policy Optimization (PPO) algorithm may be utilized in one embodiment to implement the RL agent. The policy and value networks for PPO may involve two requirements: invariance as to the number of nets, and invariance as to the cell width, i.e., WM1. Cell height HM1 may typically be constant for a given standard cell library.

The generic algorithm based routing algorithm may utilize routing segments as the genetic representation to facilitate the preservation of well-suited routing islands in the routing structure during genetic operations such as crossover and mutation. The fitness of each individual chromosome in a generation may be evaluated based on two metrics: (1) a number of unrouted terminal pairs, and (2) a number of DRCs. Other metrics may also be configured into the fitness function, such as a total wiring cost or Design For Manufacturing (DFM) metrics.

Therefore, in one aspect, a routing method for a circuit layout disclosed herein utilizes a genetic routing algorithm to generate the candidate routes. A reinforcement learning model is applied to correct design rule constraint errors arising from the routes. Uncorrected design rule constraints from the reinforcement learning model are applied to evolve the genetic routing algorithm, possibly along with other feedback from the RL model, such as a number of unrouted terminal pairs. The routing may be confined to an M1 layer of the circuit layout, although this is not a requirement.

The reinforcement learning model may be implemented in one embodiment with a convolutional neural network generating embeddings for at least one policy neural network and a state value neural network. The convolutional neural network may receive an image of a stick depiction of the circuit layout that the reinforcement learning model transforms into action probabilities (and a state value).

A fitness function for the genetic routing algorithm may utilize a weighted sum of a number of unrouted terminal pairs in the candidate routes and a number of the design rule constraint errors in the candidate routes. Other technical features may be readily apparent to one skilled in the art from the following figures, descriptions, and claims.

Also described herein are embodiments of systems including one or more processors that include logic that when applied to the one or more processors operates a genetic routing algorithm on a circuit layout to generate a plurality of candidate routed circuit layouts, and operates a reinforced learning model to correct design rule constraint errors in the candidate routed circuit layouts. The system may also include feedback from the model of a number of the design rule constraint errors (and a number of unrouted terminal pairs) to evolve the genetic routing algorithm.

The systems may include a number of policy neural networks each including multiple fully connected layers and an operation mask. The state value neural network may also includes multiple fully connected layers. Transformation of the candidate routed circuit layouts into action probabilities and state values may be invariant in relation to a width of the stick depiction.

Artificial neural network embodiments disclosed herein include a convolutional neural network coupled to receive a circuit layout image from a genetic router, the convolutional neural network configured to transform the circuit layout image into embeddings to a plurality of policy neural networks and a state value neural network, the plurality of policy neural networks configured to transform the embeddings into action probabilities for correcting design rule constraint errors in the circuit layout image. Other technical features may be readily apparent to one skilled in the art from the following figures, descriptions, and claims.

FIG. 1A depicts a stick diagram for an embodiment of a standard latch cell. Stick diagrams are well known techniques utilized to prototype circuit designs. A stick diagram may comprise the information utilized to generate a DRC-clean layout.

In the depicted stick diagram, nets may be routed in five different physical layers, referred to as Drain, Gate, M1, M2 and M3. The M1 and M3 layers are constrained to route horizontally while the M2 layers is constrained to route vertically. Drain connection locations essentially enable some vertical routing below M1, and Gate connections enable some (typically minimal) horizontal routing. There may typically be many constraints configured on how each layer may be routed. The most strict DRC rules are typically configured on the M1 layer. On the M1 layer, the routing shapes are constrained to be positioned on a fixed grid, and cut metal shapes are constrained to be inserted between adjacent routing segments on the same track. The locations of the cut metals may be inferred from the routing assignment, and typically is subject to many DRC constraints.

Stick diagrams constrain the placement of devices on particular locations along tracks. Stick diagrams also intrinsically determine where and whether it is legal (adhering to constraints) to cut certain base layers. Locations for vias, pins, and text labels are also inferred intrinsically. Because base layer shapes and metal shapes within a standard cell are constrained to a small set of permitted locations, a set of layout sub-cells may be generated comprising all legal shape permutations that adhere to a library template and DRC rules. These may be assembled into layout candidates. When routing a candidate layout, real-time (during routing) DRC checking may be utilized to provide ongoing feedback of DRC violations.

One type of DRC constraint requires closely-placed cut metal shapes to be colored differently, for double patterning. Double patterning is a technique that splits dense (closely-placed) patterns into two interleaved patterns of less-dense features, defined by two masks. Given sufficiently accurate alignment, the two patterns marry up on the wafer surface to create much denser features than could be achieved with one mask. Double patterning techniques may utilize two complementary-colored masks used in a litho-etch, litho-etch (LELE) process.

Implementing double-patterning may require the number of shapes in a loop formed by the cut metals to be an even number as shown in FIG. 1B.

If the loop has an odd number of cut metal shapes as depicted in FIG. 1C, it becomes impossible to color it correctly. Implementing this type of DRC in MILP requires enumerating all possible loops formed by cut metals, increasing the number of constraints exponentially. However this DRC may be readily implemented utilizing embodiments of the disclosed approach.

FIG. 2A depicts an exemplary routed layout generated by a DRC configured genetic algorithm. Dotted lines depict M1 layer DRC violations.

Figure 2B:
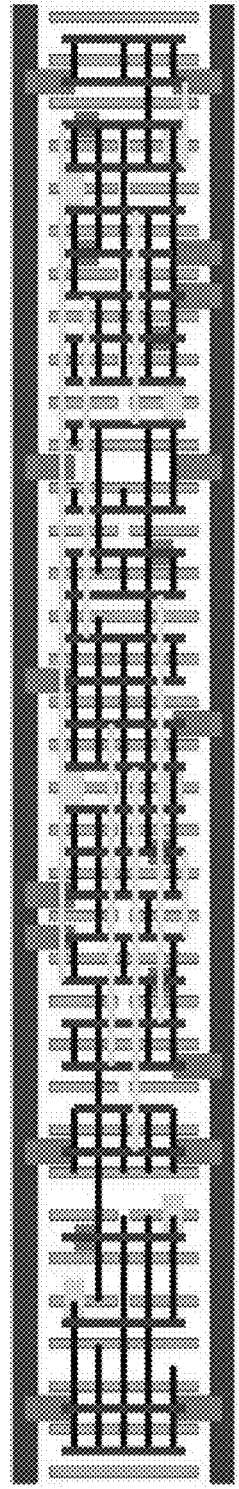
FIG. 2B depicts the routed layout of FIG. 2A after DRC fixes are applied by a reinforcement learning algorithm.

FIG. 2B depicts the routed layout of FIG. 2A after DRC fixes are applied by a reinforcement learning algorithm.

Figure 3:
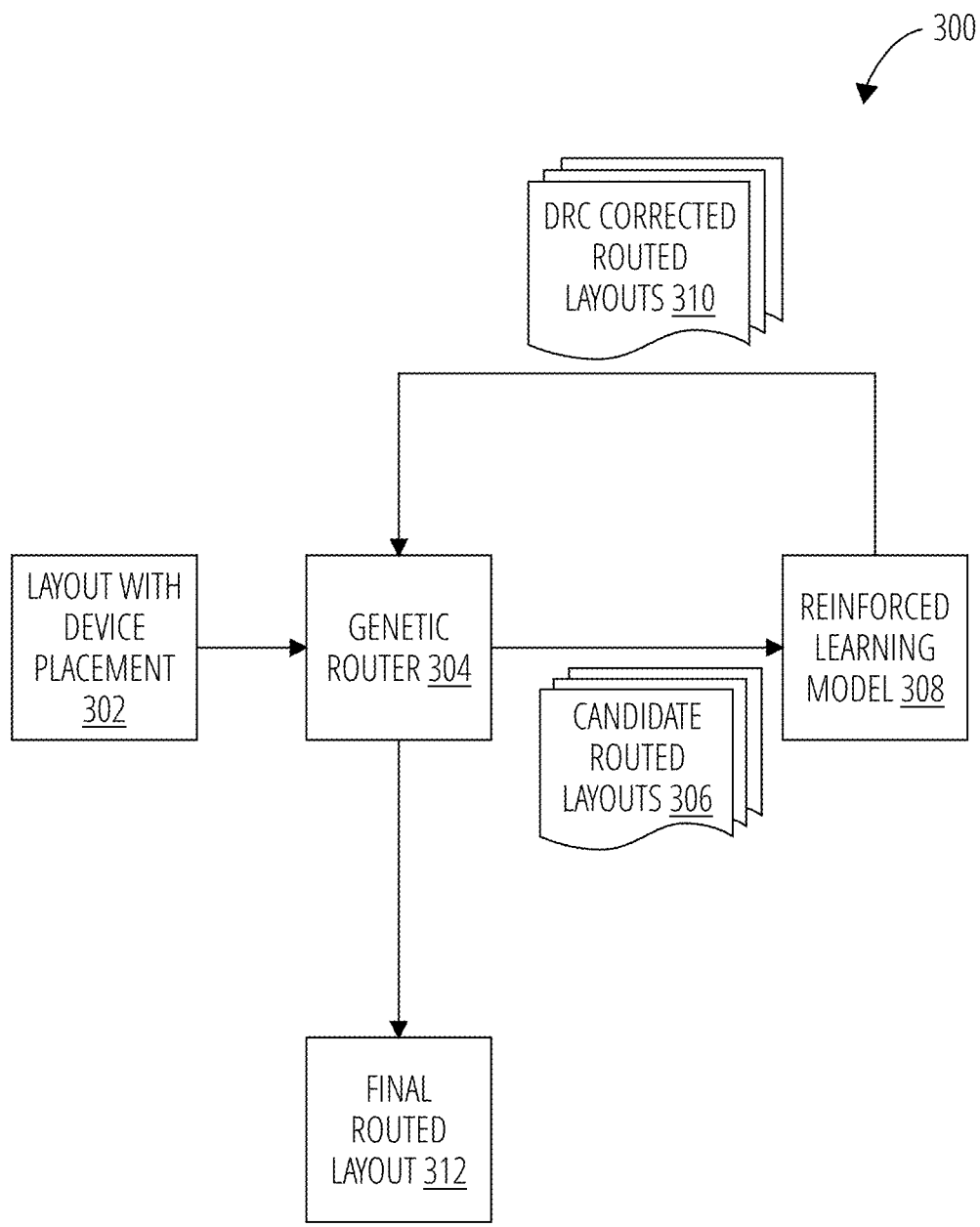
FIG. 3 depicts a circuit layout router 300 in accordance with one embodiment.

FIG. 3 depicts a circuit layout router 300 in one embodiment. A layout with device placement 302 is input to a genetic router 304, which generates a set of candidate routed layouts 306. The candidate routed layouts 306 are applied to a reinforced learning model 308 which corrects DRC errors detected in the candidate routed layouts 306 and returns a set of DRC corrected routed layouts 310 to the genetic router 304. The genetic router 304 evaluates the DRC corrected routed layouts 310 for fitness based, in part, on a number of uncorrected DRC errors remaining in the DRC corrected routed layouts 310. Eventually the genetic router 304 evolves one or more final routed layouts 312.

Figure 4:
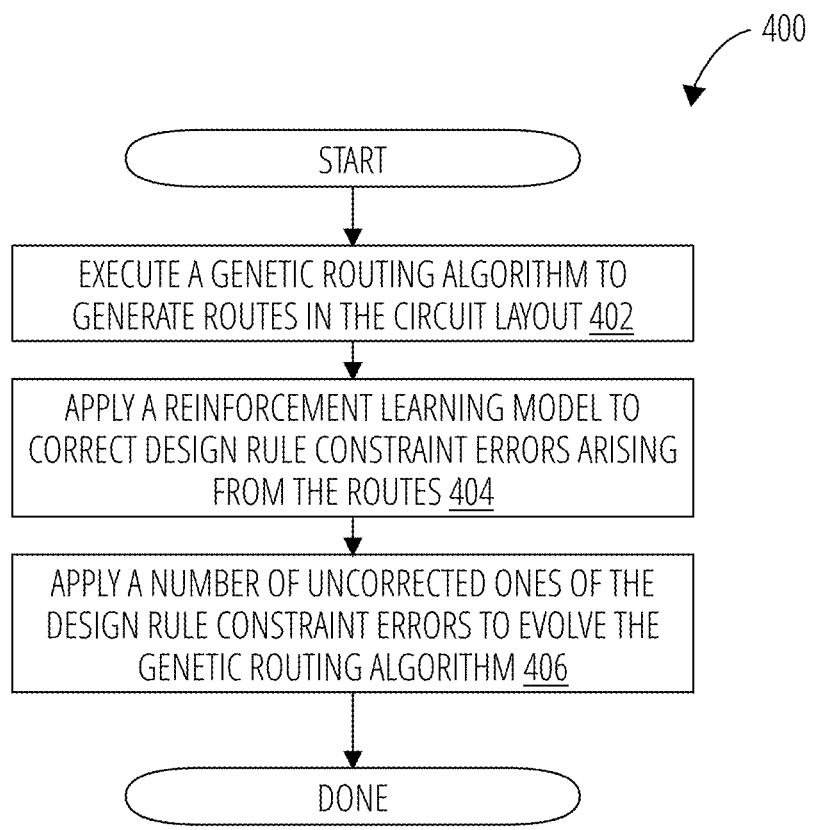
FIG. 4 depicts an incremental routing process 400 for advanced technology nodes in one embodiment.

FIG. 4 depicts an incremental routing process 400 for advanced technology nodes in one embodiment. In block 402, the incremental routing process 400 executes a genetic routing algorithm to generate routes in the circuit layout. In block 404, the incremental routing process 400 applies a reinforcement learning model to correct design rule constraint errors arising from the routes. In block 406, the incremental routing process 400 applies a number of uncorrected ones of the design rule constraint errors to evolve the genetic routing algorithm.

Figure 5:
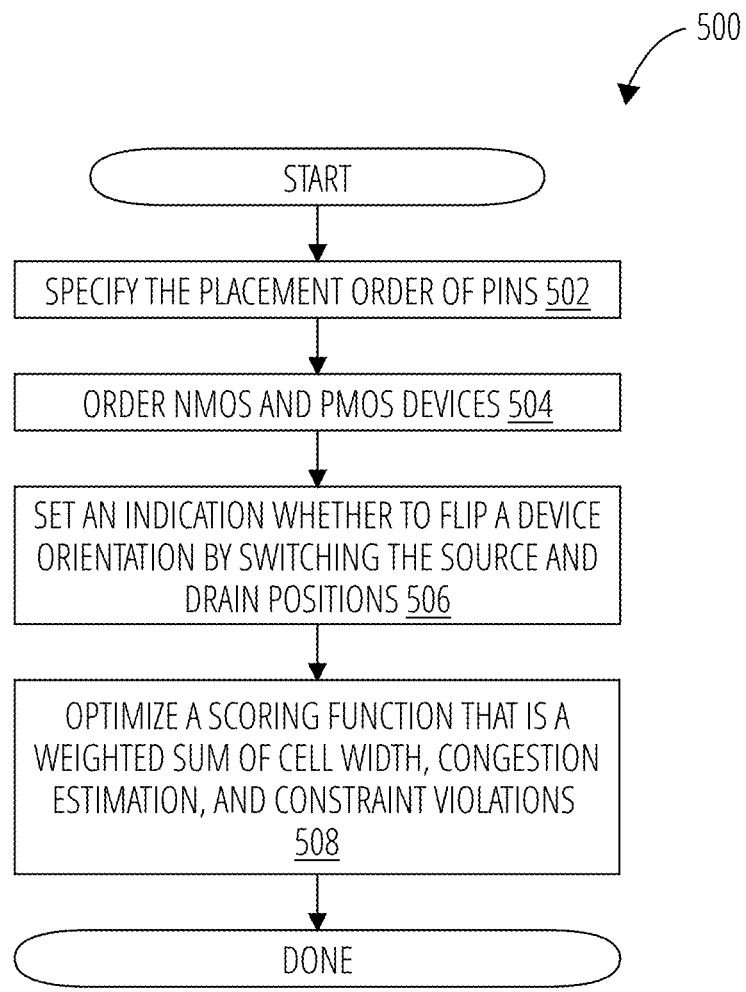
FIG. 5 depicts a simulated annealing placement routine 500 in accordance with one embodiment.

For a set of PMOS and NMOS devices in a standard cell, the placement algorithm strives to place them on the PMOS row and NMOS row of the cell layout while satisfying technology constraints. In addition to device placement, cell pin locations may be specified during placement. Some conventional device placers separate placement into two steps: pairing and ordering. The pairing step pairs up each PMOS device with a NMOS device to form device pairs. The ordering step generates placement order of device pairs, and a final placement is inferred from placement order and pairs. These two steps are interdependent, so solving one after the other is sub-optimal. Therefore in some embodiments a simulated annealing based algorithm may be utilized that performs both pairing and ordering simultaneously. Aspects of a simulated annealing placement routine 500 in one embodiment is depicted in FIG. 5.

The simulated annealing placement routine 500 may execute moves on a placement template. The moves may specify the placement order of pins (block 502), an order of NMOS and PMOS devices (block 504), and whether to flip a device orientation (switching the source and drain positions—block 506). A scoring function that is a weighted sum of cell width, congestion estimation, and technology constraint violations is optimized (block 508). Moves may be categorized either by the types of the moves or by the targeted devices of the moves. A "flip" changes all targeted devices flip flag. A "swap" swaps targeted devices. A "move" moves targeted devices to a specific location. The target devices can be either consecutive PMOS devices, consecutive NMOS devices, a consecutive PMOS/NMOS device pair, or pins. In one embodiment the simulated annealing algorithm may be implemented based on a modified Lam annealing schedule without hyper-parameter tuning.

FIG. 6 depicts a genetic routing algorithm 600 in one embodiment. Inputs to the genetic routing algorithm 600 include a set N (1 ... n) of circuit nets and sets of terminals $T_n$ for each net n of N. Each $T_n$ may be sorted left-to-right or in some other defined order (e.g., right-to-left). If sorted left-to-right, a set of terminal pairs $P_1$ may be created for each net n. The union of the sets $P_1$ is the global set of terminal pairs P. A "chromosome" in the genetic routing algorithm 600 represents a possible routing solution. The set of all such chromosomes is a generation G of the genetic routing algorithm 600. A particular chromosome $R_i$ of G is a set of terminal pairs p from the set P, and a set of (newly generated) routing segments r(p) between those terminal pairs. The routing segments r(p) may in one embodiment be generated utilizing a Lee maze router.

Each chromosome is evaluated according to a fitness function. In one embodiment the fitness function is:

$$f(R_i) = \frac{1}{\alpha U(R_i) + \beta DRC(R_i)}$$

In other words, the fitness is the reciprocal value of a weighted sum of the number of unrouted terminal pairs in $R_i$ ($U(R_i)$) and a number of remaining DRC errors ($DRC(R_i)$) in the chromosome (candidate routing solution) after applying reinforcement learning. In one embodiment the weight $\alpha$ is chosen to be larger (e.g., >2×, >3×, >5×, or one or more orders of magnitude greater) than the weight $\beta$ to prioritize fully routed solutions. Other metrics (e.g., weighted terms) may be also added into this equation, such as total wiring cost or DFM metrics. Because the PPO policy is stochastic, multiple inferences of DRC RL agent on the same route and the final route with the least amount of DRCs then selected as a solution.

A pair of candidate solutions $R_{mom}$ and $R_{dad}$ are selected from a prior generation G for crossover based on a level of fitness. In one embodiment the probability of a chromosome $R_i$ being selected for crossover is given by:

$$\frac{f(R_i)}{\Sigma_i\, f(R_i)}$$

In other words, candidate solutions with the highest fitness in a generation G are selected for crossover. In one embodiment crossover is carried out as follows:
  Select a cut point in the chromosome. The cut can be either vertical or horizontal.
  For a vertical cut, the crossover operator takes all the $r_{mom}(p)$ routes that lie completely on the left hand side of the vertical cut, and all the $r_{dad}(p)$ routes that lie completely on the right hand side of the cut, and generates a descendant in the next generation from this chromosome pair.
  The crossover operator also generates another descendant in the next generation with right side routes from $R_{mom}$ and left side routes from $R_{dad}$.
  A horizontal cut is processed similarly.
  For each descendant generated by crossover, a mutation operator may randomly (with a probability of $Prob_m$) select a region in the candidate layout and remove any routes r(p) in the descendant that touch this region. After mutation, the remaining open terminal pairs may be routed with the maze router using a random terminal pair order.

Both initial routing and subsequent routing of unrouted terminal pairs may be carried out with a maze router that utilizes the grid space of stick representations and a Lee algorithm to search for minimum routes between two terminals. To explore more routing spaces, the maze router may execute a number I>1 iterations and select the solution with a minimum number of unrouted pairs. The maze router may also produce any random route between two terminals with the same cost (weighted routing cost per segment).

Figure 7:
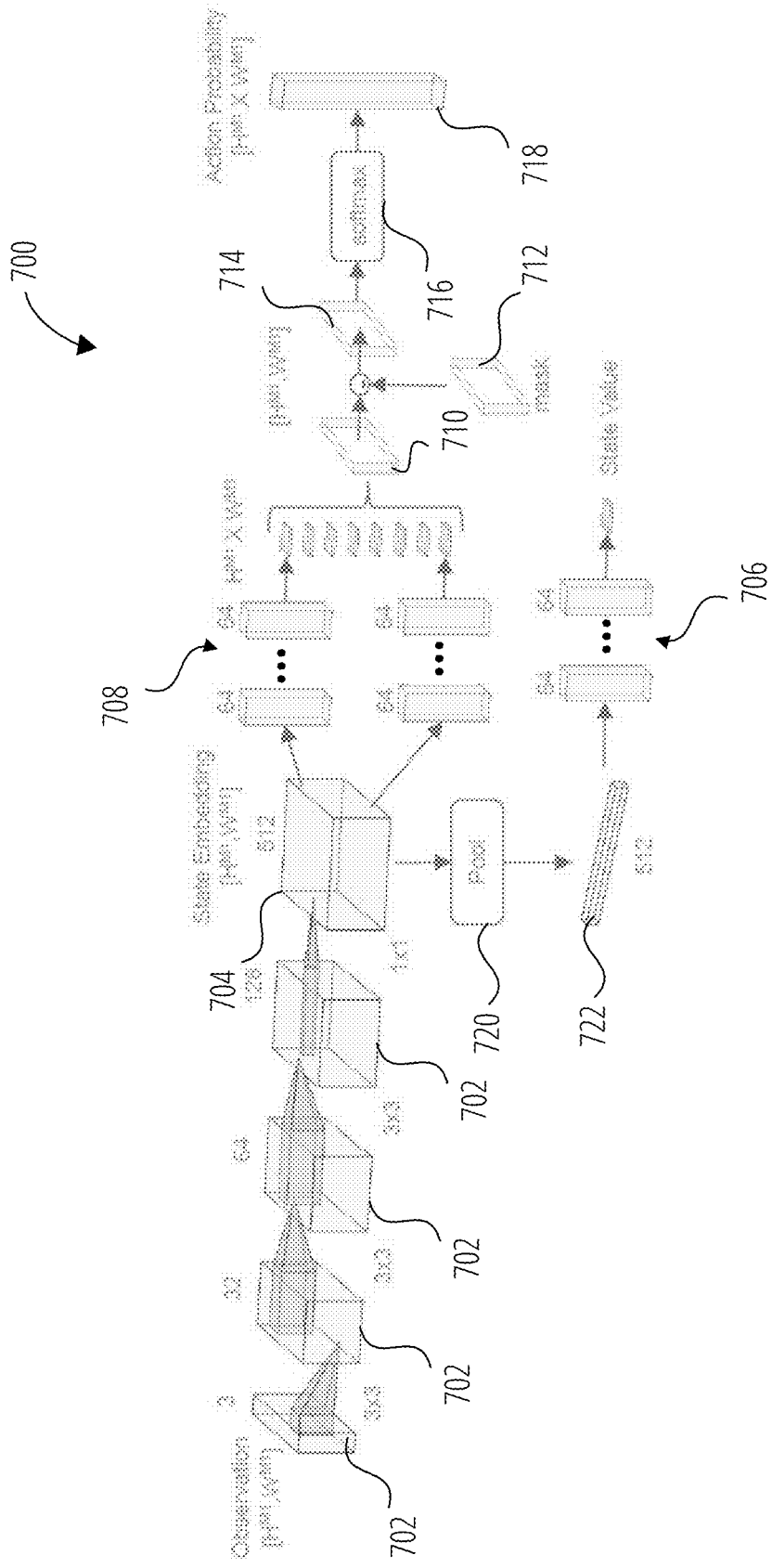
FIG. 7 depicts a reinforcement learning artificial neural network 700 for DRC correction in accordance with one embodiment.

FIG. 7 depicts a reinforcement learning artificial neural network 700 for DRC error correction in one embodiment. DRC error correction by the reinforcement learning artificial neural network 700 may be focused in the M1 layer, with DRC errors in other layers being fixed in the routing step. M1 layer DRC errors arise from constraints on cut metal locations. The cut metal locations in turn are inherently determined from the M1 routes. Therefore, changing M1 routes modifies cut metal locations, which in turn change the M1 DRCs. The reinforcement learning may thus be configured to incrementally change the M1 routes in order to reduce M1 DRCs. This methodology may in some embodiments be extended to fix DRCs in other layers as well where incremental changes to the routes is effective in modifying those DRCs.

The reinforcement learning may be configured to restrict the addition of new routes to the M1 layer and not to evaluate the removal of existing M1 routes. This constraint helps ensure the routability of the initial routed solution. It places a limit on the solution space of the DRC fixing step which is ameliorated because the genetic algorithm routing step creates multiple routing solutions that extend the solution space.

A reinforcement learning algorithm may be characterized by its observation space, action space, internal states, reward, and done condition. In one embodiment the internal state of the DRC reinforcement learning environment is the grid space of the stick layout representations. The observation space (obs) is represented in a box tensor of dimensions $[3, H^{M1}, W^{M1}]$. $H^{M1}$ and $W^{M1}$ are the M1 layer grid dimension. obs[0, :, :] represents the M1 layer routes. obs[1, :, :] represents the routing mask. Two conditions are configured for valid routing grids: (1) they are adjacent to an existing routed grid and (2) they do not create potential shorts to other routes. obs[2, :, :] represents the DRC information.

The action space act is a categorical tensor $[H^{M1} \times W^{M1}]$. It represents the probability of whether any of the M1 layer grid $[H^{M1}, W^{M1}]$ should be routed. The stick representation of the layout is updated according to this action and DRC checker returns any new DRCs that apply after the action.

There are two types of rewards given by the environment. $r_s$ is a negative reward given at each step. This negative incentive for continuing compels the agent to finish the game as soon as possible. $r_d$ is a reward associated with DRC improvement, $r_d = R_d \times \Delta DRC$, where $R_d$ is a coefficient and $\Delta DRC$ is the reduction of number of DRC errors reported by DRC checker. This reward drives the agent to reduce DRCs as much as possible.

The agent completes its processing under two 'done' conditions. First, when there is no available action for the next step, i.e., the mask layer obs [1, :, :]=0. Second, when the number of DRCs is zero, i.e. the DRC layer obs[2, :, :]=0.

In one embodiment a Proximal Policy Optimization (PPO) algorithm is utilized for DRC fixing. The PPO algorithm is a policy gradient based RL algorithm. The PPO algorithm includes two policy models: (1) a training model, and (2) a roll-out model. The training model is responsible for learning model parameters, and the roll-out model is responsible for collecting training data while interacting with the environment.

The PPO algorithm utilizes an objective function that provides limited divergence between the training model and the roll-out model. A deep learning model that utilizes PPO may comprise two subnetworks: (1) a state value subnet that predicts the current state, and (2) a policy subnet that produces the policy probability for each action. These two subnetworks may share a common parent network that generates embeddings applied in each of the separate subnetworks.

A reinforcement learning model for PPO may have two requirements: (1) invariance as to the number of nets, and (2) invariance as to the cell width, i.e., $W^{M1}$. The cell height $H^{M1}$ is typically a constant for a given technology library. The observation space described above is independent of the number of nets, therefore the first requirement is satisfied. The second requirement, however, is not satisfied by default since the observation space and the action space are both dependent on $W^{M1}$. The reinforcement learning artificial neural network 700 embodiment depicted in FIG. 7 eliminates this dependency.

In the depicted reinforcement learning artificial neural network 700 embodiment, the observation obs (e.g., the stick layout as a two-dimensional digital image) is passed into a number (e.g., four) convolution layers 702. Each of the convolution layers 702 may utilize a VALID padding technique (assumes that all the dimensions are valid so that the input image gets fully covered by a filter and the stride) to generate output activations having the same height and width as the input vector. The output of the last convolution layer is the state embedding 704, which in the depicted embodiment has the tensor [512,$H^{M1}$,$W^{M1}$]. The state embedding 704 is input to both the state value network 706 and one or more policy networks 708. The policy networks 708 depicted each comprise a number of fully connected layers (e.g., three) with channel dimensions (64,64,1). Each pixel of the state embedding 704 may be input to these fully connected layers. Because the channel dimension of each pixel on the state embedding 704 is fixed (e.g., at 512), the parameters of those fully connected layers are not dependent on the size of the input image. The outputs of the policy networks 708 for all the $H^{M1} \times W^{M1}$ pixels are collected together (collected outputs 710), masked with the action mask 712 from the observation into masked outputs 714, and input to a Softmax layer 716 to generate the final action policies 718 vector.

To produce the state value, the state embedding 704 in this example is input to a pooling layer 720 (e.g., avgpool) to form a 512 wide vector 722. This vector 722 is input to state value network 706 which comprises a number (e.g., three) of fully connected layers. In the depicted example these layers process vectors with channel dimensions (64,64,1). The outputs of the state value network 706 are the state value predictions. The state value network 706 is independent of the size of the input stick depiction image.

The algorithms and techniques disclosed herein may be executed by computing devices utilizing one or more graphic processing unit (GPU) and/or general purpose data processor (e.g., a 'central processing unit or CPU). Those of ordinary skill in the art will appreciate that certain GPU computing architectures, e.g. as provided by Nvidia Corp®, provide features tailored to implementation of deep learning and routing algorithms. Exemplary architectures will now be described that may be configured to carry out the techniques disclosed herein on such devices.

For example the reinforcement learning algorithm embodiments described herein may be implemented in Python based on the OpenAI GYM framework. The genetic algorithm and maze router may also implemented in Python. Training for the reinforcement learning model may be conducted on a NVIDIA V100 GPU. The genetic routing algorithm may be executed on a NVIDIA DGX server with 64 CPU cores (Intel Xeon CPU E5-2698 v4 @ 2.20 GHz) and 8 V100 GPUs. The hyperparameters of the genetic algorithm may be set as follows: G=200, K=24, Probm=0.01, TR=10, α=100, 3=1.

The following description may use certain acronyms and abbreviations as follows:
"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 8:
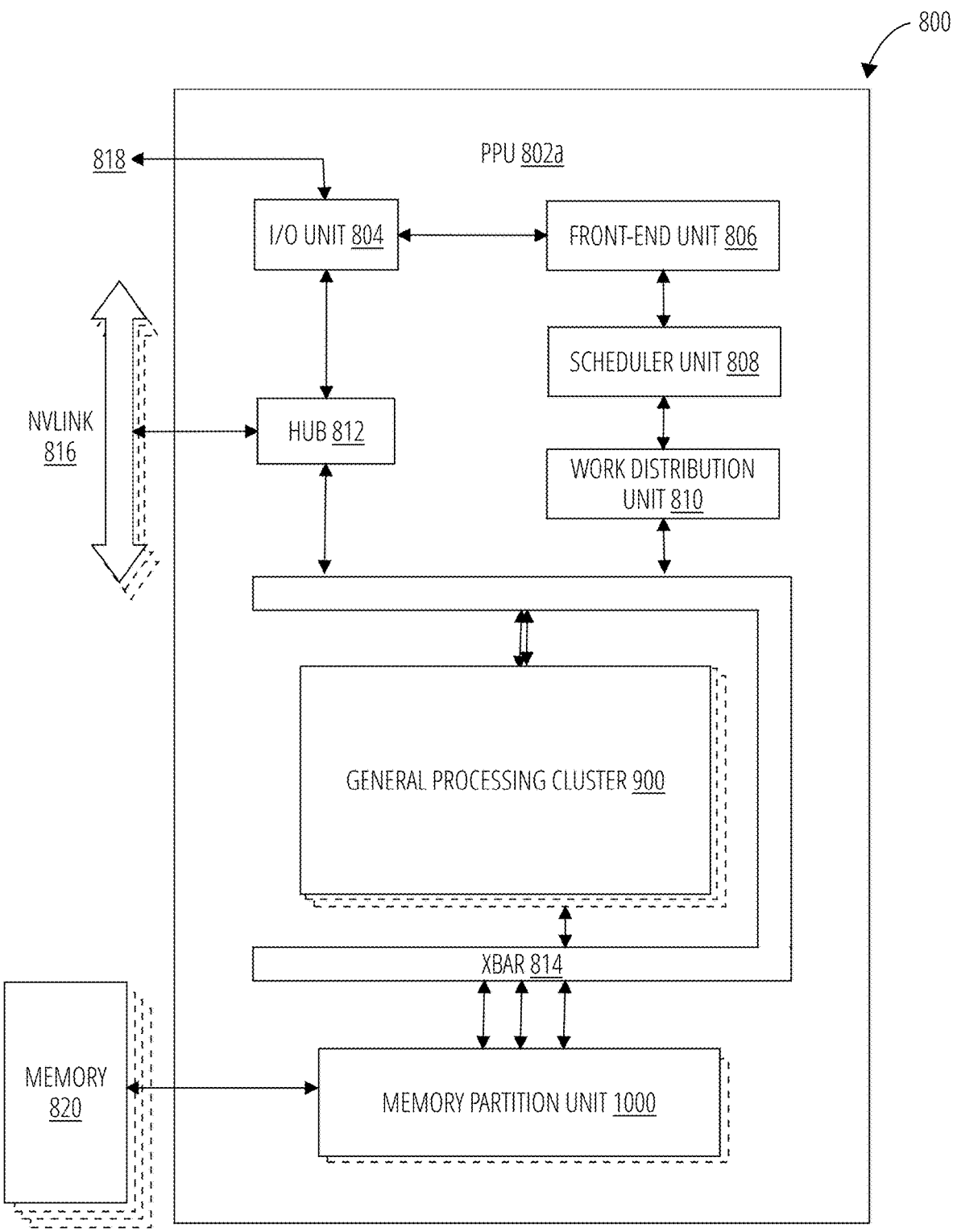
FIG. 8 depicts a parallel processing unit 802a in accordance with one embodiment.

FIG. 8 depicts a computing system 800 including a parallel processing unit 802*a*, in accordance with an embodiment. In an embodiment, the parallel processing unit 802*a* is a multi-threaded processor that is implemented on one or more integrated circuit devices. The parallel processing unit 802*a* is a latency hiding architecture designed to process many threads in parallel. A thread (e.g., a thread of execution) is an instantiation of a set of instructions configured to be executed by the parallel processing unit 802*a*. In an embodiment, the parallel processing unit 802*a* is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 802*a* may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 802*a* modules may be configured to accelerate thousands of High Performance Computing (HPC), data center, and machine learning applications. The parallel processing unit 802*a* may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 8, the parallel processing unit 802*a* includes an I/O unit 804, a front-end unit 806, a scheduler unit 808, a work distribution unit 810, a hub 812, a crossbar 814, one or more general processing cluster 900 modules, and one or more memory partition unit 1000 modules. The parallel processing unit 802*a* may be connected to a host processor or other parallel processing unit 802*a* modules via one or more high-speed NVLink 816 interconnects. The parallel processing unit 802*a* may be connected to a host processor or other peripheral devices via an interconnect 818. The parallel processing unit 802*a* may also be connected to a local memory comprising a number of memory 820 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 820 may comprise logic to configure the parallel processing unit 802*a* to carry out aspects of the techniques disclosed herein.

The NVLink 816 interconnect enables systems to scale and include one or more parallel processing unit 802*a* modules combined with one or more CPUs, supports cache coherence between the parallel processing unit 802*a* modules and CPUs, and CPU mastering. Data and/or commands may be transmitted by the NVLink 816 through the hub 812 to/from other units of the parallel processing unit 802*a* such as one or more copy engines, a video encoder, a video decoder, a power management unit, etc. (not explicitly shown). The NVLink 816 is described in more detail in conjunction with FIG. 12.

The I/O unit 804 is configured to transmit and receive communications (e.g., commands, data, etc.) from a host processor (not shown) over the interconnect 818. The I/O unit 804 may communicate with the host processor directly via the interconnect 818 or through one or more intermediate devices such as a memory bridge. In an embodiment, the I/O unit 804 may communicate with one or more other processors, such as one or more parallel processing unit 802*a* modules via the interconnect 818. In an embodiment, the I/O unit 804 implements a Peripheral Component Interconnect Express (PCIe) interface for communications over a PCIe bus and the interconnect 818 is a PCIe bus. In alternative embodiments, the I/O unit 804 may implement other types of well-known interfaces for communicating with external devices.

The I/O unit 804 decodes packets received via the interconnect 818. In an embodiment, the packets represent commands configured to cause the parallel processing unit 802*a* to perform various operations. The I/O unit 804 transmits the decoded commands to various other units of the parallel processing unit 802*a* as the commands may specify. For example, some commands may be transmitted to the front-end unit 806. Other commands may be transmitted to the hub 812 or other units of the parallel processing unit 802*a* such as one or more copy engines, a video encoder, a video decoder, a power management unit, etc. (not explicitly shown). In other words, the I/O unit 804 is configured to route communications between and among the various logical units of the parallel processing unit 802*a*.

In an embodiment, a program executed by the host processor encodes a command stream in a buffer that provides workloads to the parallel processing unit 802*a* for processing. A workload may comprise several instructions and data to be processed by those instructions. The buffer is a region in a memory that is accessible (e.g., read/write) by both the host processor and the parallel processing unit 802*a*. For example, the I/O unit 804 may be configured to access the buffer in a system memory connected to the interconnect 818 via memory requests transmitted over the interconnect 818. In an embodiment, the host processor writes the command stream to the buffer and then transmits a pointer to the start of the command stream to the parallel processing unit 802*a*. The front-end unit 806 receives pointers to one or more command streams. The front-end unit 806 manages the one or more streams, reading commands from the streams and forwarding commands to the various units of the parallel processing unit 802*a*.

The front-end unit 806 is coupled to a scheduler unit 808 that configures the various general processing cluster 900 modules to process tasks defined by the one or more streams. The scheduler unit 808 is configured to track state information related to the various tasks managed by the scheduler unit 808. The state may indicate which general processing cluster 900 a task is assigned to, whether the task is active or inactive, a priority level associated with the task, and so forth. The scheduler unit 808 manages the execution of a plurality of tasks on the one or more general processing cluster 900 modules.

The scheduler unit 808 is coupled to a work distribution unit 810 that is configured to dispatch tasks for execution on the general processing cluster 900 modules. The work distribution unit 810 may track a number of scheduled tasks received from the scheduler unit 808. In an embodiment, the work distribution unit 810 manages a pending task pool and an active task pool for each of the general processing cluster 900 modules. The pending task pool may comprise a number of slots (e.g., 32 slots) that contain tasks assigned to be processed by a particular general processing cluster 900. The active task pool may comprise a number of slots (e.g., 4 slots) for tasks that are actively being processed by the general processing cluster 900 modules. As a general processing cluster 900 finishes the execution of a task, that task is evicted from the active task pool for the general processing cluster 900 and one of the other tasks from the pending task pool is selected and scheduled for execution on the general processing cluster 900. If an active task has been idle on the general processing cluster 900, such as while waiting for a data dependency to be resolved, then the active task may be evicted from the general processing cluster 900 and returned to the pending task pool while another task in the pending task pool is selected and scheduled for execution on the general processing cluster 900.

The work distribution unit 810 communicates with the one or more general processing cluster 900 modules via crossbar 814. The crossbar 814 is an interconnect network that couples many of the units of the parallel processing unit 802*a* to other units of the parallel processing unit 802*a*. For example, the crossbar 814 may be configured to couple the work distribution unit 810 to a particular general processing cluster 900. Although not shown explicitly, one or more other units of the parallel processing unit 802*a* may also be connected to the crossbar 814 via the hub 812.

The tasks are managed by the scheduler unit 808 and dispatched to a general processing cluster 900 by the work distribution unit 810. The general processing cluster 900 is configured to process the task and generate results. The results may be consumed by other tasks within the general processing cluster 900, routed to a different general processing cluster 900 via the crossbar 814, or stored in the memory 820. The results can be written to the memory 820 via the memory partition unit 1000 modules, which implement a memory interface for reading and writing data to/from the memory 820. The results can be transmitted to another parallel processing unit 802*a* or CPU via the NVLink 816. In an embodiment, the parallel processing unit 802*a* includes a number U of memory partition unit 1000 modules that is equal to the number of separate and distinct memory 820 devices coupled to the parallel processing unit 802*a*. A memory partition unit 1000 will be described in more detail below in conjunction with FIG. 10.

In an embodiment, a host processor executes a driver kernel that implements an application programming interface (API) that enables one or more applications executing on the host processor to schedule operations for execution on the parallel processing unit 802a. In an embodiment, multiple compute applications are simultaneously executed by the parallel processing unit 802a and the parallel processing unit 802a provides isolation, quality of service (QoS), and independent address spaces for the multiple compute applications. An application may generate instructions (e.g., API calls) that cause the driver kernel to generate one or more tasks for execution by the parallel processing unit 802a. The driver kernel outputs tasks to one or more streams being processed by the parallel processing unit 802a. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 11.

Figure 9:
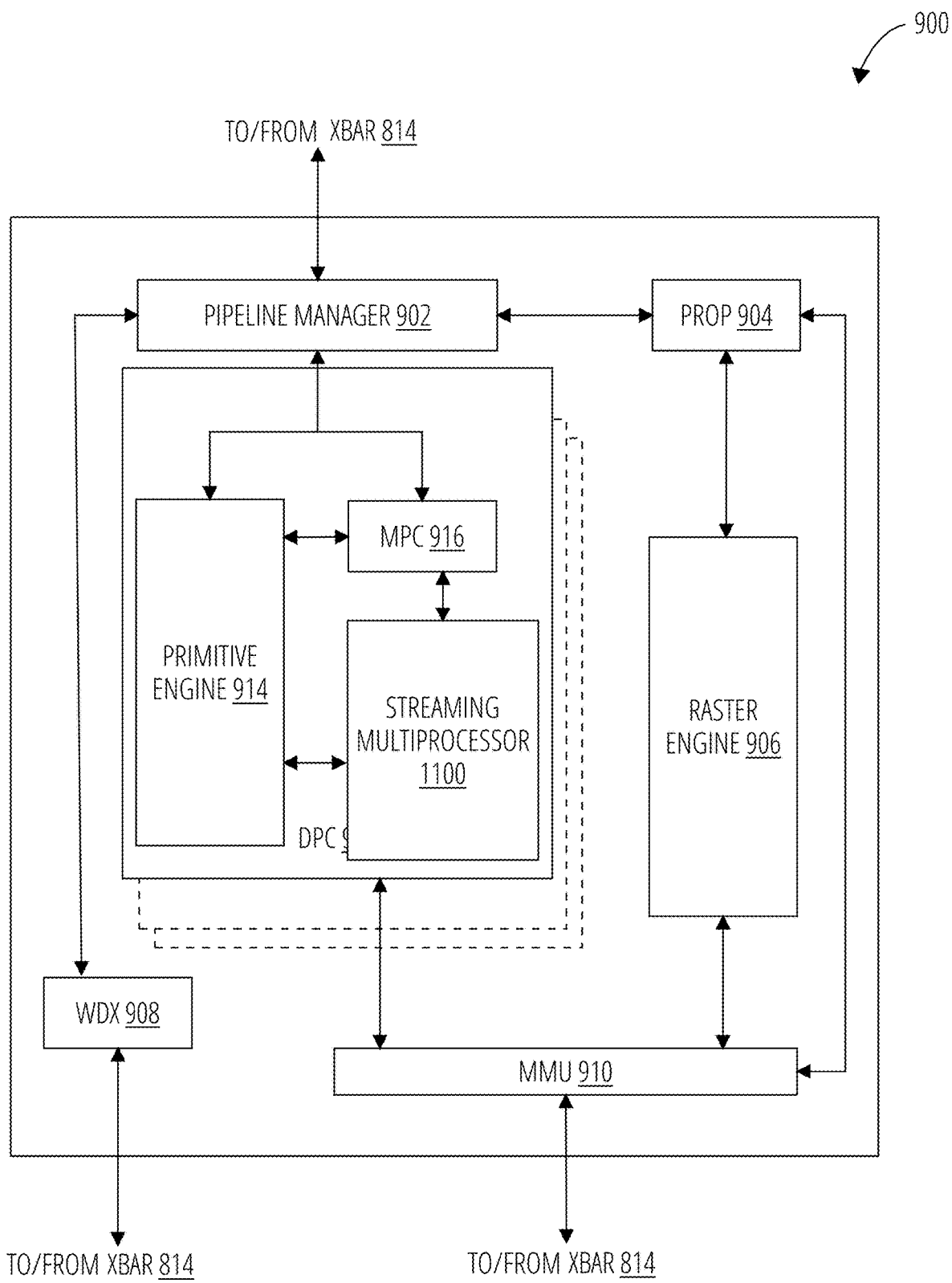
FIG. 9 depicts a general processing cluster 900 in accordance with one embodiment.

FIG. 9 depicts a general processing cluster 900 of the parallel processing unit 802a of FIG. 8, in accordance with an embodiment. As shown in FIG. 9, each general processing cluster 900 includes a number of hardware units for processing tasks. In an embodiment, each general processing cluster 900 includes a pipeline manager 902, a pre-raster operations unit 904, a raster engine 906, a work distribution crossbar 908, a memory management unit 910, and one or more data processing cluster 912. It will be appreciated that the general processing cluster 900 of FIG. 9 may include other hardware units in lieu of or in addition to the units shown in FIG. 9.

In an embodiment, the operation of the general processing cluster 900 is controlled by the pipeline manager 902. The pipeline manager 902 manages the configuration of the one or more data processing cluster 912 modules for processing tasks allocated to the general processing cluster 900. In an embodiment, the pipeline manager 902 may configure at least one of the one or more data processing cluster 912 modules to implement at least a portion of a graphics rendering pipeline. For example, a data processing cluster 912 may be configured to execute a vertex shader program on the programmable streaming multiprocessor 1100. The pipeline manager 902 may also be configured to route packets received from the work distribution unit 810 to the appropriate logical units within the general processing cluster 900. For example, some packets may be routed to fixed function hardware units in the pre-raster operations unit 904 and/or raster engine 906 while other packets may be routed to the data processing cluster 912 modules for processing by the primitive engine 914 or the streaming multiprocessor 1100. In an embodiment, the pipeline manager 902 may configure at least one of the one or more data processing cluster 912 modules to implement a neural network model and/or a computing pipeline.

Figure 10:
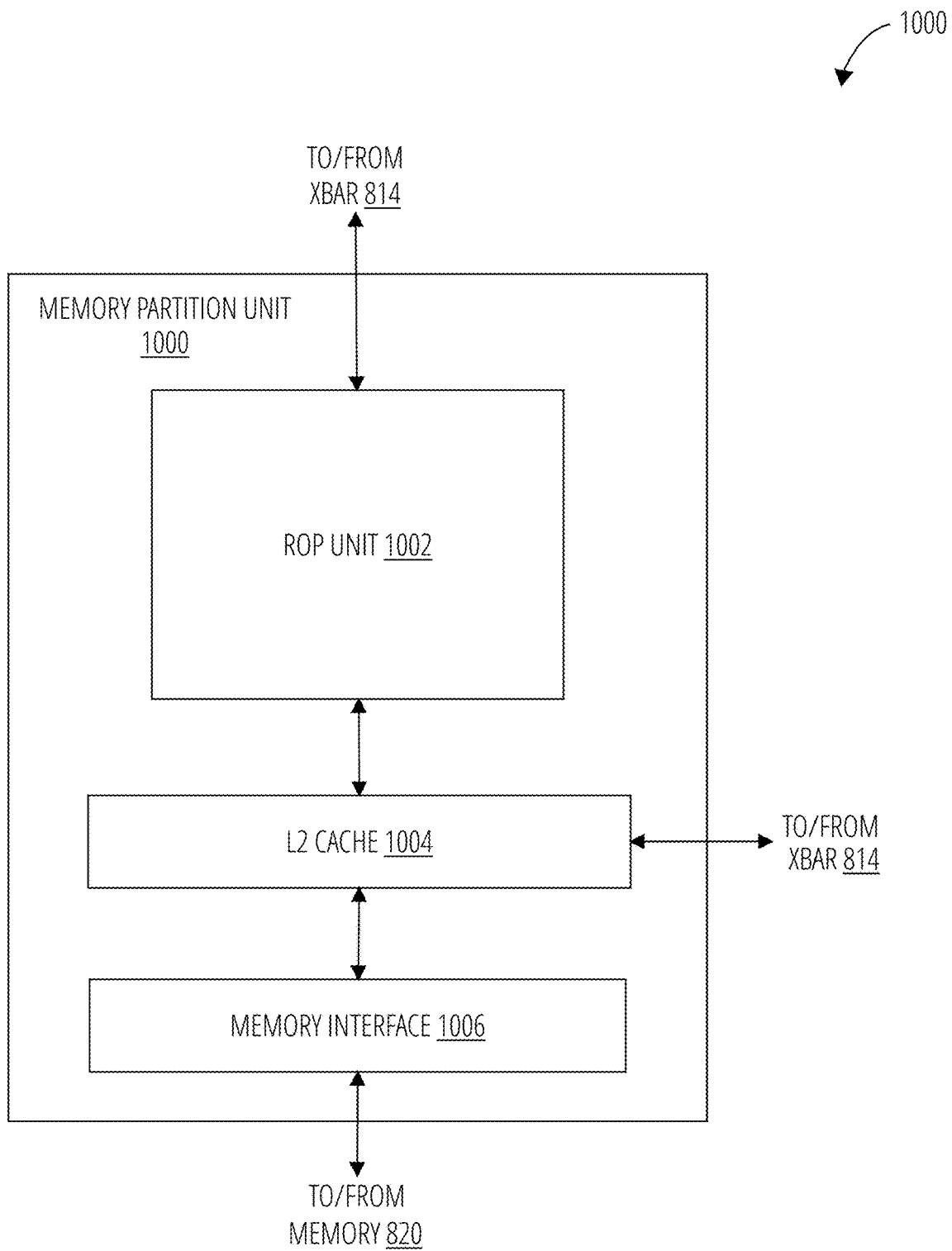
FIG. 10 depicts a memory partition unit 1000 in accordance with one embodiment.

The pre-raster operations unit 904 is configured to route data generated by the raster engine 906 and the data processing cluster 912 modules to a Raster Operations (ROP) unit, described in more detail in conjunction with FIG. 10. The pre-raster operations unit 904 may also be configured to perform optimizations for color blending, organize pixel data, perform address translations, and the like.

The raster engine 906 includes a number of fixed function hardware units configured to perform various raster operations. In an embodiment, the raster engine 906 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 906 comprises fragments to be processed, for example, by a fragment shader implemented within a data processing cluster 912.

Each data processing cluster 912 included in the general processing cluster 900 includes an M-pipe controller 916, a primitive engine 914, and one or more streaming multiprocessor 1100 modules. The M-pipe controller 916 controls the operation of the data processing cluster 912, routing packets received from the pipeline manager 902 to the appropriate units in the data processing cluster 912. For example, packets associated with a vertex may be routed to the primitive engine 914, which is configured to fetch vertex attributes associated with the vertex from the memory 820. In contrast, packets associated with a shader program may be transmitted to the streaming multiprocessor 1100.

The streaming multiprocessor 1100 comprises a programmable streaming processor that is configured to process tasks represented by a number of threads. Each streaming multiprocessor 1100 is multi-threaded and configured to execute a plurality of threads (e.g., 32 threads) from a particular group of threads concurrently. In an embodiment, the streaming multiprocessor 1100 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1100 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1100 will be described in more detail below in conjunction with FIG. 11.

The memory management unit 910 provides an interface between the general processing cluster 900 and the memory partition unit 1000. The memory management unit 910 may provide translation of virtual addresses into physical addresses, memory protection, and arbitration of memory requests. In an embodiment, the memory management unit 910 provides one or more translation lookaside buffers (TLBs) for performing translation of virtual addresses into physical addresses in the memory 820.

FIG. 10 depicts a memory partition unit 1000 of the parallel processing unit 802a of FIG. 8, in accordance with an embodiment. As shown in FIG. 10, the memory partition unit 1000 includes a raster operations unit 1002, a level two cache 1004, and a memory interface 1006. The memory interface 1006 is coupled to the memory 820. Memory interface 1006 may implement 32, 64, 128, 1024-bit data buses, or the like, for high-speed data transfer. In an embodiment, the parallel processing unit 802a incorporates U memory interface 1006 modules, one memory interface 1006 per pair of memory partition unit 1000 modules, where each pair of memory partition unit 1000 modules is connected to a corresponding memory 820 device. For example, parallel processing unit 802a may be connected to up to Y memory 820 devices, such as high bandwidth memory stacks or graphics double-data-rate, version 5, synchronous dynamic random access memory, or other types of persistent storage.

In an embodiment, the memory interface 1006 implements an HBM2 memory interface and Y equals half U. In an embodiment, the HBM2 memory stacks are located on the same physical package as the parallel processing unit 802a, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 820 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 802a modules process very large datasets and/or run applications for extended periods.

In an embodiment, the parallel processing unit 802a implements a multi-level memory hierarchy. In an embodiment, the memory partition unit 1000 supports a unified memory to provide a single unified virtual address space for CPU and parallel processing unit 802a memory, enabling data sharing between virtual memory systems. In an embodiment the frequency of accesses by a parallel processing unit 802a to memory located on other processors is traced to ensure that memory pages are moved to the physical memory of the parallel processing unit 802a that is accessing the pages more frequently. In an embodiment, the NVLink 816 supports address translation services allowing the parallel processing unit 802a to directly access a CPU's page tables and providing full access to CPU memory by the parallel processing unit 802a.

In an embodiment, copy engines transfer data between multiple parallel processing unit 802a modules or between parallel processing unit 802a modules and CPUs. The copy engines can generate page faults for addresses that are not mapped into the page tables. The memory partition unit 1000 can then service the page faults, mapping the addresses into the page table, after which the copy engine can perform the transfer. In a conventional system, memory is pinned (e.g., non-pageable) for multiple copy engine operations between multiple processors, reducing the available memory. With hardware page faulting, addresses can be passed to the copy engines without worrying if the memory pages are resident, and the copy process is transparent.

Data from the memory 820 or other system memory may be fetched by the memory partition unit 1000 and stored in the level two cache 1004, which is located on-chip and is shared between the various general processing cluster 900 modules. As shown, each memory partition unit 1000 includes a portion of the level two cache 1004 associated with a corresponding memory 820 device. Lower level caches may then be implemented in various units within the general processing cluster 900 modules. For example, each of the streaming multiprocessor 1100 modules may implement an L1 cache. The L1 cache is private memory that is dedicated to a particular streaming multiprocessor 1100. Data from the level two cache 1004 may be fetched and stored in each of the L1 caches for processing in the functional units of the streaming multiprocessor 1100 modules. The level two cache 1004 is coupled to the memory interface 1006 and the crossbar 814.

The raster operations unit 1002 performs graphics raster operations related to pixel color, such as color compression, pixel blending, and the like. The raster operations unit 1002 also implements depth testing in conjunction with the raster engine 906, receiving a depth for a sample location associated with a pixel fragment from the culling engine of the raster engine 906. The depth is tested against a corresponding depth in a depth buffer for a sample location associated with the fragment. If the fragment passes the depth test for the sample location, then the raster operations unit 1002 updates the depth buffer and transmits a result of the depth test to the raster engine 906. It will be appreciated that the number of partition memory partition unit 1000 modules may be different than the number of general processing cluster 900 modules and, therefore, each raster operations unit 1002 may be coupled to each of the general processing cluster 900 modules. The raster operations unit 1002 tracks packets received from the different general processing cluster 900 modules and determines which general processing cluster 900 that a result generated by the raster operations unit 1002 is routed to through the crossbar 814. Although the raster operations unit 1002 is included within the memory partition unit 1000 in FIG. 10, in other embodiments, the raster operations unit 1002 may be outside of the memory partition unit 1000. For example, the raster operations unit 1002 may reside in the general processing cluster 900 or another unit.

Figure 11:
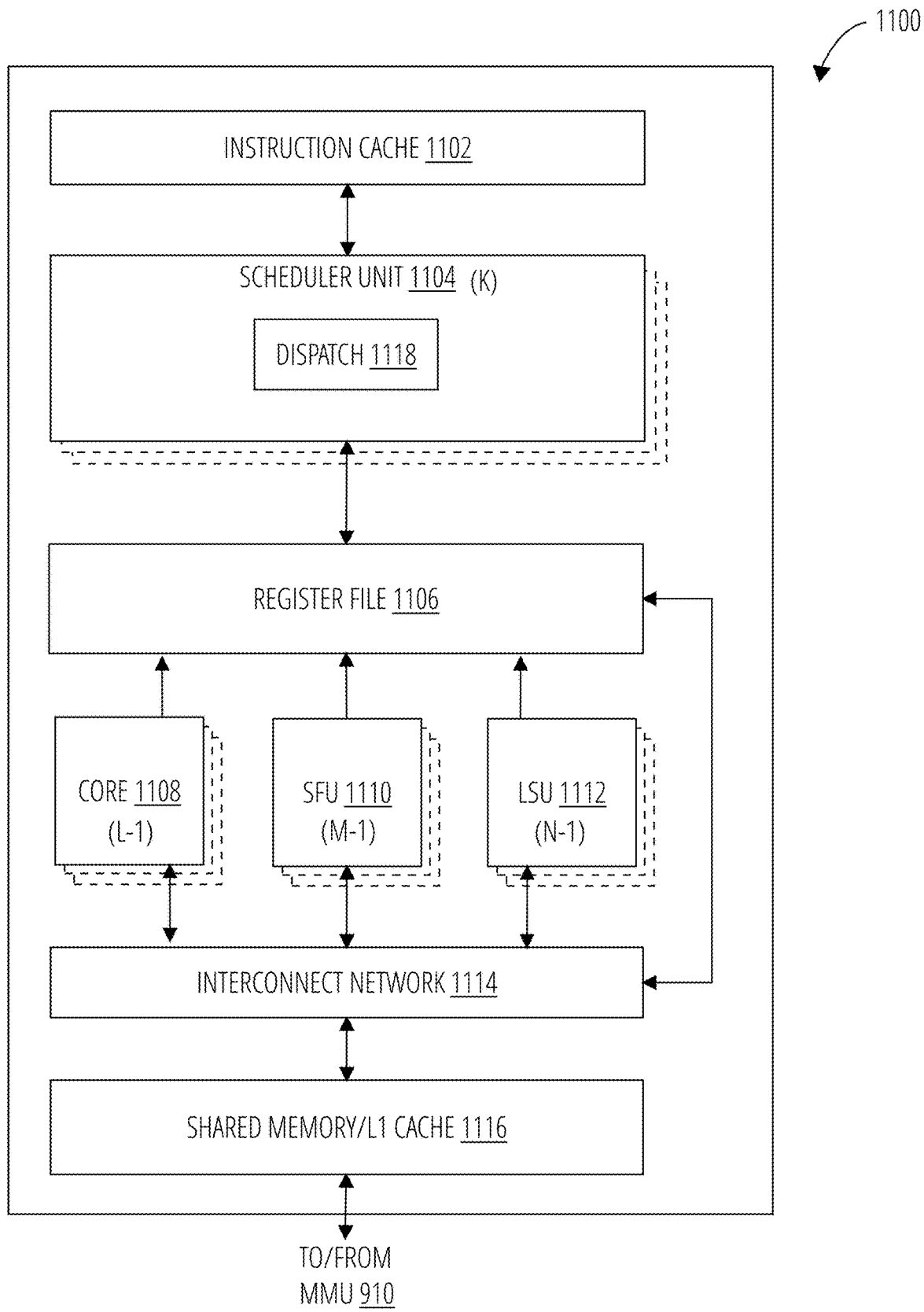
FIG. 11 depicts a streaming multiprocessor 1100 in accordance with one embodiment.

FIG. 11 illustrates the streaming multiprocessor 1100 of FIG. 9, in accordance with an embodiment. As shown in FIG. 11, the streaming multiprocessor 1100 includes an instruction cache 1102, one or more scheduler unit 1104 modules (e.g., such as scheduler unit 808), a register file 1106, one or more processing core 1108 modules, one or more special function unit 1110 modules, one or more load/store unit 1112 modules, an interconnect network 1114, and a shared memory/L1 cache 1116.

As described above, the work distribution unit 810 dispatches tasks for execution on the general processing cluster 900 modules of the parallel processing unit 802a. The tasks are allocated to a particular data processing cluster 912 within a general processing cluster 900 and, if the task is associated with a shader program, the task may be allocated to a streaming multiprocessor 1100. The scheduler unit 808 receives the tasks from the work distribution unit 810 and manages instruction scheduling for one or more thread blocks assigned to the streaming multiprocessor 1100. The scheduler unit 1104 schedules thread blocks for execution as warps of parallel threads, where each thread block is allocated at least one warp. In an embodiment, each warp executes 32 threads. The scheduler unit 1104 may manage a plurality of different thread blocks, allocating the warps to the different thread blocks and then dispatching instructions from the plurality of different cooperative groups to the various functional units (e.g., core 1108 modules, special function unit 1110 modules, and load/store unit 1112 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1118 unit is configured within the scheduler unit 1104 to transmit instructions to one or more of the functional units. In one embodiment, the scheduler unit 1104 includes two dispatch 1118 units that enable two different instructions from the same warp to be dispatched during each clock cycle. In alternative embodiments, each scheduler unit 1104 may include a single dispatch 1118 unit or additional dispatch 1118 units.

Each streaming multiprocessor 1100 includes a register file 1106 that provides a set of registers for the functional units of the streaming multiprocessor 1100. In an embodiment, the register file 1106 is divided between each of the functional units such that each functional unit is allocated a dedicated portion of the register file 1106. In another embodiment, the register file 1106 is divided between the different warps being executed by the streaming multiprocessor 1100. The register file 1106 provides temporary storage for operands connected to the data paths of the functional units.

Each streaming multiprocessor 1100 comprises L processing core 1108 modules. In an embodiment, the streaming multiprocessor 1100 includes a large number (e.g., 128, etc.) of distinct processing core 1108 modules. Each core 1108 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1108 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1108 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply involves 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1100 also comprises M special function unit 1110 modules that perform special functions (e.g., attribute evaluation, reciprocal square root, and the like). In an embodiment, the special function unit 1110 modules may include a tree traversal unit configured to traverse a hierarchical tree data structure. In an embodiment, the special function unit 1110 modules may include texture unit configured to perform texture map filtering operations. In an embodiment, the texture units are configured to load texture maps (e.g., a 2D array of texels) from the memory 820 and sample the texture maps to produce sampled texture values for use in shader programs executed by the streaming multiprocessor 1100. In an embodiment, the texture maps are stored in the shared memory/L1 cache 1116. The texture units implement texture operations such as filtering operations using mip-maps (e.g., texture maps of varying levels of detail). In an embodiment, each streaming multiprocessor 1100 includes two texture units.

Each streaming multiprocessor 1100 also comprises N load/store unit 1112 modules that implement load and store operations between the shared memory/L1 cache 1116 and the register file 1106. Each streaming multiprocessor 1100 includes an interconnect network 1114 that connects each of the functional units to the register file 1106 and the load/store unit 1112 to the register file 1106 and shared memory/L1 cache 1116. In an embodiment, the interconnect network 1114 is a crossbar that can be configured to connect any of the functional units to any of the registers in the register file 1106 and connect the load/store unit 1112 modules to the register file 1106 and memory locations in shared memory/L1 cache 1116.

The shared memory/L1 cache 1116 is an array of on-chip memory that allows for data storage and communication between the streaming multiprocessor 1100 and the primitive engine 914 and between threads in the streaming multiprocessor 1100. In an embodiment, the shared memory/L1 cache 1116 comprises 128 KB of storage capacity and is in the path from the streaming multiprocessor 1100 to the memory partition unit 1000. The shared memory/L1 cache 1116 can be used to cache reads and writes. One or more of the shared memory/L1 cache 1116, level two cache 1004, and memory 820 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1116 enables the shared memory/L1 cache 1116 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 8, are bypassed, creating a much simpler programming model. In the general purpose parallel computation configuration, the work distribution unit 810 assigns and distributes blocks of threads directly to the data processing cluster 912 modules. The threads in a block execute the same program, using a unique thread ID in the calculation to ensure each thread generates unique results, using the streaming multiprocessor 1100 to execute the program and perform calculations, shared memory/L1 cache 1116 to communicate between threads, and the load/store unit 1112 to read and write global memory through the shared memory/L1 cache 1116 and the memory partition unit 1000. When configured for general purpose parallel computation, the streaming multiprocessor 1100 can also write commands that the scheduler unit 808 can use to launch new work on the data processing cluster 912 modules.

The parallel processing unit 802a may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 802a is embodied on a single semiconductor substrate. In another embodiment, the parallel processing unit 802a is included in a system-on-a-chip (SoC) along with one or more other devices such as additional parallel processing unit 802a modules, the memory 820, a reduced instruction set computer (RISC) CPU, a memory management unit (MMU), a digital-to-analog converter (DAC), and the like.

In an embodiment, the parallel processing unit 802a may be included on a graphics card that includes one or more memory devices. The graphics card may be configured to interface with a PCIe slot on a motherboard of a desktop computer. In yet another embodiment, the parallel processing unit 802a may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 12:
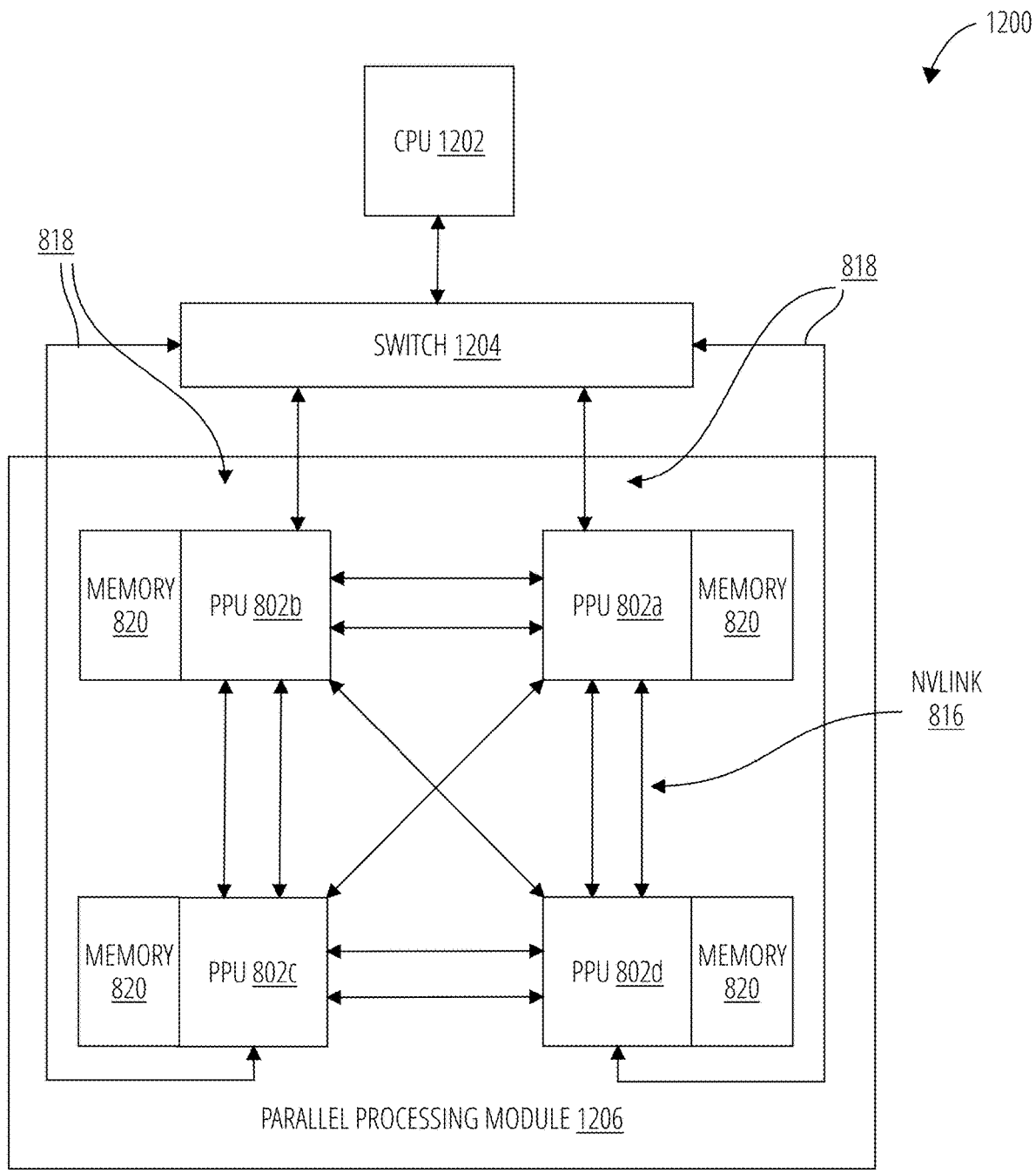
FIG. 12 depicts a processing system 1200 in accordance with one embodiment.

FIG. 12 is a conceptual diagram of a processing system 1200 implemented using the parallel processing unit 802a of FIG. 8, in accordance with an embodiment. The processing system 1200 includes a central processing unit 1202, switch 1204, and multiple parallel processing units 802a, 802b, 802c, 802d each with respective memory 820 modules. The NVLink 816 provides high-speed communication links between each of the parallel processing unit 802a modules. Although a particular number of NVLink 816 and interconnect 818 connections are illustrated in FIG. 12, the number of connections to each parallel processing unit 802a and the central processing unit 1202 may vary. The switch 1204 interfaces between the interconnect 818 and the central processing unit 1202. The parallel processing unit 802a modules, memory 820 modules, and NVLink 816 connections may be situated on a single semiconductor platform to form a parallel processing module 1206. In an embodiment, the switch 1204 supports two or more protocols to interface between various different connections and/or links.

In another embodiment (not shown), the NVLink 816 provides one or more high-speed communication links between each of the parallel processing unit modules (parallel processing unit 802b, parallel processing unit 802a, parallel processing unit 802a, and parallel processing unit 802c) and the central processing unit 1202 and the switch 1204 interfaces between the interconnect 818 and each of the parallel processing unit modules. The parallel processing unit modules, memory 820 modules, and interconnect 818 may be situated on a single semiconductor platform to form a parallel processing module 1206. In yet another embodiment (not shown), the interconnect 818 provides one or more communication links between each of the parallel processing unit modules and the central processing unit 1202 and the switch 1204 interfaces between each of the parallel processing unit modules using the NVLink 816 to provide one or more high-speed communication links between the parallel processing unit modules. In another embodiment (not shown), the NVLink 816 provides one or more high-speed communication links between the parallel processing unit modules and the central processing unit 1202 through the switch 1204. In yet another embodiment (not shown), the interconnect 818 provides one or more communication links between each of the parallel processing unit modules directly. One or more of the NVLink 816 high-speed communication links may be implemented as a physical NVLink interconnect or either an on-chip or on-die interconnect using the same protocol as the NVLink 816.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1206 may be implemented as a circuit board substrate and each of the parallel processing unit modules and/or memory 820 modules may be packaged devices. In an embodiment, the central processing unit 1202, switch 1204, and the parallel processing module 1206 are situated on a single semiconductor platform.

In an embodiment, the signaling rate of each NVLink 816 is 20 to 25 Gigabits/second and each parallel processing unit module includes six NVLink 816 interfaces (as shown in FIG. 12, five NVLink 816 interfaces are included for each parallel processing unit module). Each NVLink 816 provides a data transfer rate of 25 Gigabytes/second in each direction, with six links providing 300 Gigabytes/second. The NVLink 816 can be used exclusively for PPU-to-PPU communication as shown in FIG. 12, or some combination of PPU-to-PPU and PPU-to-CPU, when the central processing unit 1202 also includes one or more NVLink 816 interfaces.

In an embodiment, the NVLink 816 allows direct load/store/atomic access from the central processing unit 1202 to each parallel processing unit module's memory 820. In an embodiment, the NVLink 816 supports coherency operations, allowing data read from the memory 820 modules to be stored in the cache hierarchy of the central processing unit 1202, reducing cache access latency for the central processing unit 1202. In an embodiment, the NVLink 816 includes support for Address Translation Services (ATS), enabling the parallel processing unit module to directly access page tables within the central processing unit 1202. One or more of the NVLink 816 may also be configured to operate in a low-power mode.

Figure 13:
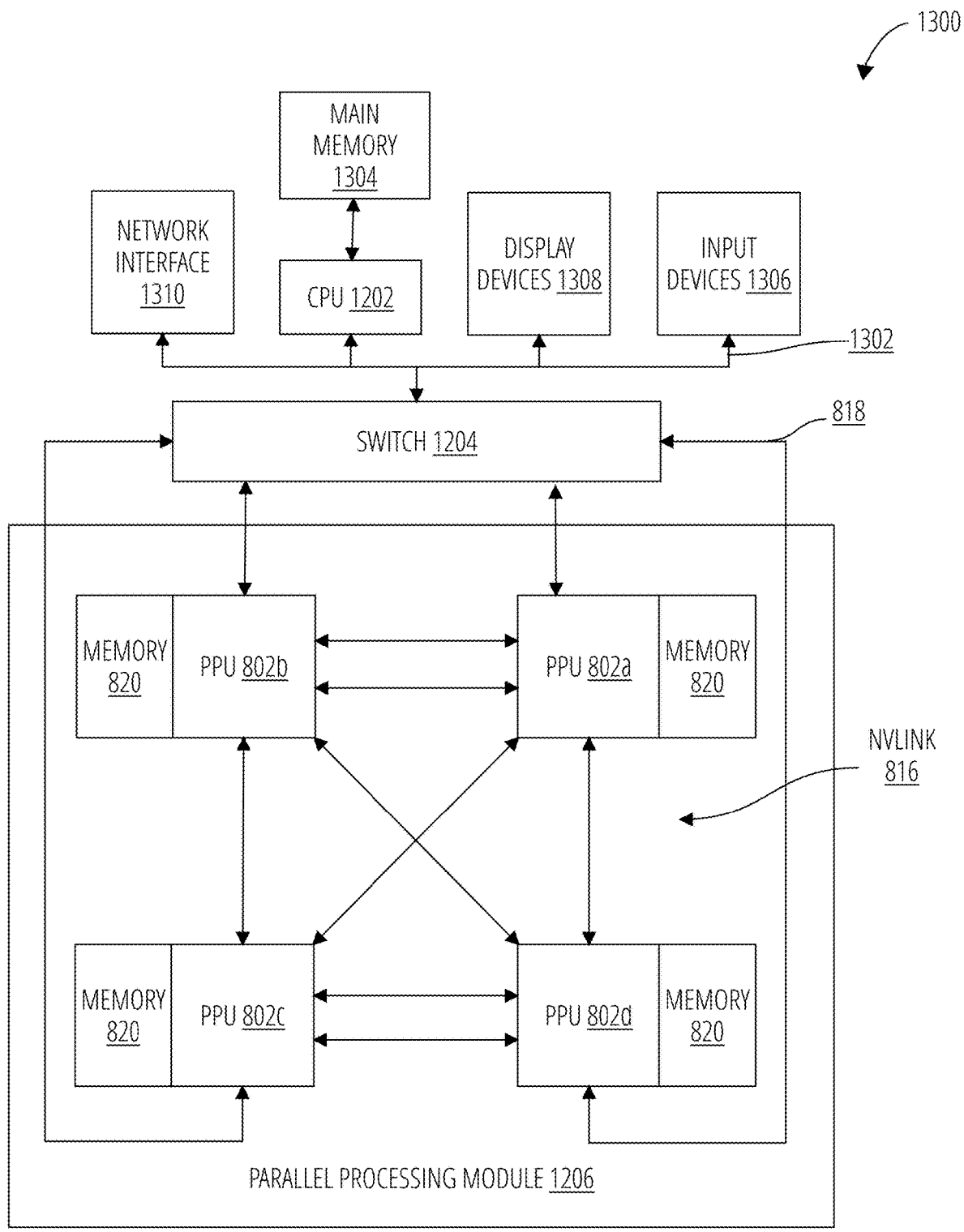
FIG. 13 depicts an exemplary processing system 1300 in accordance with another embodiment.

FIG. 13 depicts an exemplary processing system 1300 in which the various architecture and/or functionality of the various previous embodiments may be implemented. As shown, an exemplary processing system 1300 is provided including at least one central processing unit 1202 that is connected to a communications bus 1302. The communication communications bus 1302 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1300 also includes a main memory 1304. Control logic (software) and data are stored in the main memory 1304 which may take the form of random access memory (RAM).

The exemplary processing system 1300 also includes input devices 1306, the parallel processing module 1206, and display devices 1308, e.g. a conventional CRT (cathode ray tube), LCD (liquid crystal display), LED (light emitting diode), plasma display or the like. User input may be received from the input devices 1306, e.g., keyboard, mouse, touchpad, microphone, and the like. Each of the foregoing modules and/or devices may even be situated on a single semiconductor platform to form the exemplary processing system 1300. Alternately, the various modules may also be situated separately or in various combinations of semiconductor platforms per the desires of the user.

Further, the exemplary processing system 1300 may be coupled to a network (e.g., a telecommunications network, local area network (LAN), wireless network, wide area network (WAN) such as the Internet, peer-to-peer network, cable network, or the like) through a network interface 1310 for communication purposes.

The exemplary processing system 1300 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1304 and/or the secondary storage. Such computer programs, when executed, enable the exemplary processing system 1300 to perform various functions. The main memory 1304, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1300 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described, it should be understood that they have been presented by way of example, and not limitation. Thus, the breadth and scope of an embodiment should not be limited by any of the above-described exemplary embodiments, but should be defined in accordance with the following claims and their equivalents.

Graphics Processing Pipeline

Figure 14:
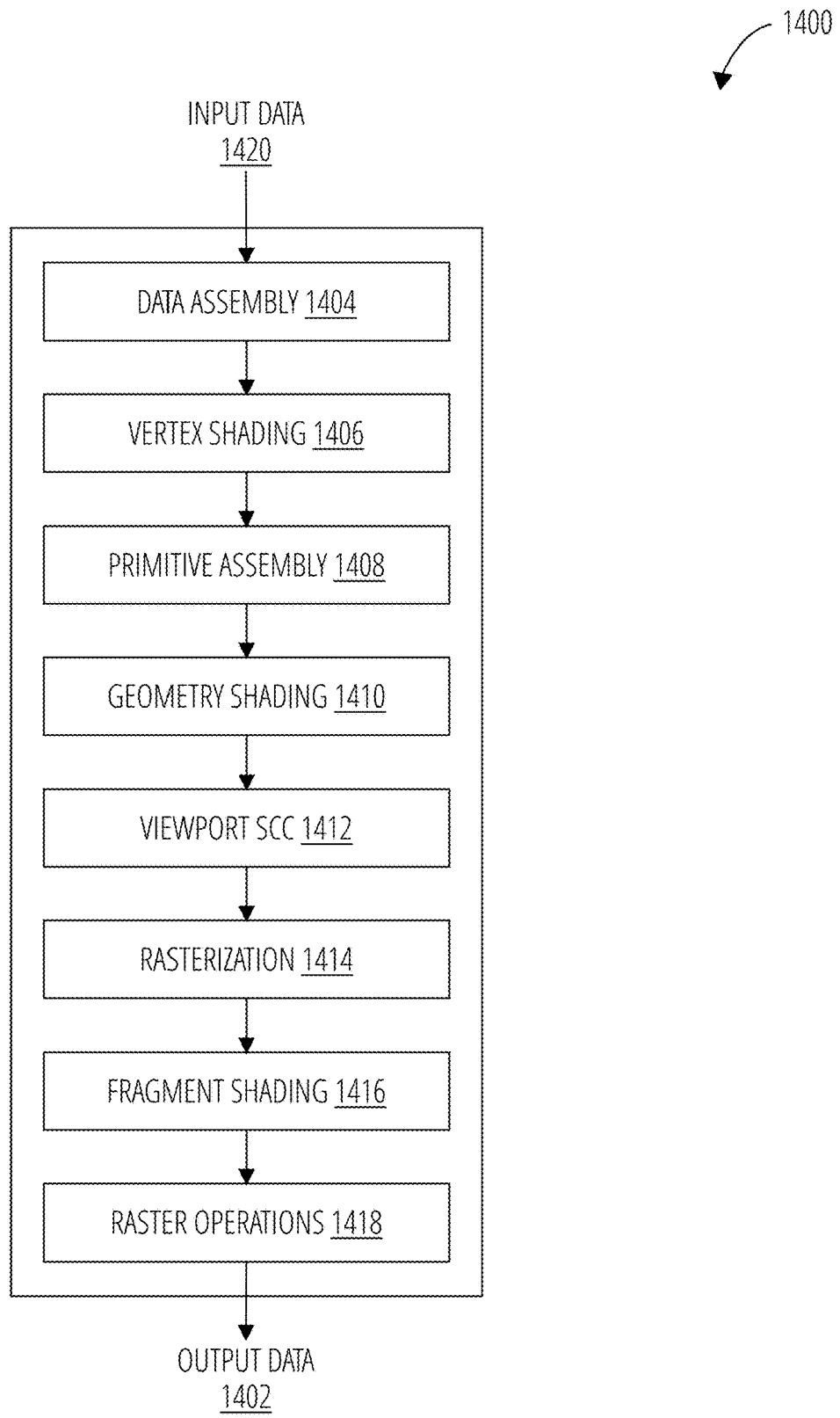
FIG. 14 depicts a graphics processing pipeline 1400 in accordance with one embodiment.

FIG. 14 is a conceptual diagram of a graphics processing pipeline 1400 implemented by the parallel processing unit 802a of FIG. 8, in accordance with an embodiment. In an embodiment, the parallel processing unit 802a comprises a graphics processing unit (GPU). The parallel processing unit 802a is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 802a can be configured to process the graphics primitives to generate a frame buffer (e.g., pixel data for each of the pixels of the display).

An application writes model data for a scene (e.g., a collection of vertices and attributes) to a memory such as a system memory or memory 820. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1100 modules of the parallel processing unit 802a including one or more of a vertex shader, hull shader, domain shader, geometry shader, and a pixel shader. For example, one or more of the streaming multiprocessor 1100 modules may be configured to execute a vertex shader program that processes a number of vertices defined by the model data. In an embodiment, the different streaming multiprocessor 1100 modules may be configured to execute different shader programs concurrently. For example, a first subset of streaming multiprocessor 1100 modules may be configured to execute a vertex shader program while a second subset of streaming multiprocessor 1100 modules may be configured to execute a pixel shader program. The first subset of streaming multiprocessor 1100 modules processes vertex data to produce processed vertex data and writes the processed vertex data to the level two cache 1004 and/or the memory 820. After the processed vertex data is rasterized (e.g., transformed from three-dimensional data into two-dimensional data in screen space) to produce fragment data, the second subset of streaming multiprocessor 1100 modules executes a pixel shader to produce processed fragment data, which is then blended with other processed fragment data and written to the frame buffer in memory 820. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1400 receives input data 601 that is transmitted from one stage to the next stage of the graphics processing pipeline 1400 to generate output data 1402. In an embodiment, the graphics processing pipeline 1400 may represent a graphics processing pipeline defined by the OpenGL® API. As an option, the graphics processing pipeline 1400 may be implemented in the context of the functionality and architecture of the previous Figures and/or any subsequent Figure(s).

As shown in FIG. 14, the graphics processing pipeline 1400 comprises a pipeline architecture that includes a number of stages. The stages include, but are not limited to, a data assembly 1404 stage, a vertex shading 1406 stage, a primitive assembly 1408 stage, a geometry shading 1410 stage, a viewport SCC 1412 stage, a rasterization 1414 stage, a fragment shading 1416 stage, and a raster operations 1418 stage. In an embodiment, the input data 1420 comprises commands that configure the processing units to implement the stages of the graphics processing pipeline 1400 and geometric primitives (e.g., points, lines, triangles, quads, triangle strips or fans, etc.) to be processed by the stages. The output data 1402 may comprise pixel data (e.g., color data) that is copied into a frame buffer or other type of surface data structure in a memory.

The data assembly 1404 stage receives the input data 1420 that specifies vertex data for high-order surfaces, primitives, or the like. The data assembly 1404 stage collects the vertex data in a temporary storage or queue, such as by receiving a command from the host processor that includes a pointer to a buffer in memory and reading the vertex data from the buffer. The vertex data is then transmitted to the vertex shading 1406 stage for processing.

The vertex shading 1406 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1406 stage may manipulate individual vertex attributes such as position, color, texture coordinates, and the like. In other words, the vertex shading 1406 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1406 stage generates transformed vertex data that is transmitted to the primitive assembly 1408 stage.

The primitive assembly 1408 stage collects vertices output by the vertex shading 1406 stage and groups the vertices into geometric primitives for processing by the geometry shading 1410 stage. For example, the primitive assembly 1408 stage may be configured to group every three consecutive vertices as a geometric primitive (e.g., a triangle) for transmission to the geometry shading 1410 stage. In some embodiments, specific vertices may be reused for consecutive geometric primitives (e.g., two consecutive triangles in a triangle strip may share two vertices). The primitive assembly 1408 stage transmits geometric primitives (e.g., a collection of associated vertices) to the geometry shading 1410 stage.

The geometry shading 1410 stage processes geometric primitives by performing a set of operations (e.g., a geometry shader or program) on the geometric primitives. Tessellation operations may generate one or more geometric primitives from each geometric primitive. In other words, the geometry shading 1410 stage may subdivide each geometric primitive into a finer mesh of two or more geometric primitives for processing by the rest of the graphics processing pipeline 1400. The geometry shading 1410 stage transmits geometric primitives to the viewport SCC 1412 stage.

In an embodiment, the graphics processing pipeline 1400 may operate within a streaming multiprocessor and the vertex shading 1406 stage, the primitive assembly 1408 stage, the geometry shading 1410 stage, the fragment shading 1416 stage, and/or hardware/software associated therewith, may sequentially perform processing operations. Once the sequential processing operations are complete, in an embodiment, the viewport SCC 1412 stage may utilize the data. In an embodiment, primitive data processed by one or more of the stages in the graphics processing pipeline 1400 may be written to a cache (e.g. L1 cache, a vertex cache, etc.). In this case, in an embodiment, the viewport SCC 1412 stage may access the data in the cache. In an embodiment, the viewport SCC 1412 stage and the rasterization 1414 stage are implemented as fixed function circuitry.

The viewport SCC 1412 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1414 stage.

The rasterization 1414 stage converts the 3D geometric primitives into 2D fragments (e.g. capable of being utilized for display, etc.). The rasterization 1414 stage may be configured to utilize the vertices of the geometric primitives to setup a set of plane equations from which various attributes can be interpolated. The rasterization 1414 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1414 stage generates fragment data (e.g., interpolated vertex attributes associated with a particular sample location for each covered pixel) that are transmitted to the fragment shading 1416 stage.

The fragment shading 1416 stage processes fragment data by performing a set of operations (e.g., a fragment shader or a program) on each of the fragments. The fragment shading 1416 stage may generate pixel data (e.g., color values) for the fragment such as by performing lighting operations or sampling texture maps using interpolated texture coordinates for the fragment. The fragment shading 1416 stage generates pixel data that is transmitted to the raster operations 1418 stage.

The raster operations 1418 stage may perform various operations on the pixel data such as performing alpha tests, stencil tests, and blending the pixel data with other pixel data corresponding to other fragments associated with the pixel. When the raster operations 1418 stage has finished processing the pixel data (e.g., the output data 1402), the pixel data may be written to a render target such as a frame buffer, a color buffer, or the like.

It will be appreciated that one or more additional stages may be included in the graphics processing pipeline 1400 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1410 stage). Other types of graphics processing pipelines are contemplated as being within the scope of the present disclosure. Furthermore, any of the stages of the graphics processing pipeline 1400 may be implemented by one or more dedicated hardware units within a graphics processor such as parallel processing unit 802a. Other stages of the graphics processing pipeline 1400 may be implemented by programmable hardware units such as the streaming multiprocessor 1100 of the parallel processing unit 802a.

The graphics processing pipeline 1400 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 802a. The API provides an abstraction for a programmer that lets a programmer utilize specialized graphics hardware, such as the parallel processing unit 802a, to generate the graphical data without requiring the programmer to utilize the specific instruction set for the parallel processing unit 802a. The application may include an API call that is routed to the device driver for the parallel processing unit 802a. The device driver interprets the API call and performs various operations to respond to the API call. In some instances, the device driver may perform operations by executing instructions on the CPU. In other instances, the device driver may perform operations, at least in part, by launching operations on the parallel processing unit 802a utilizing an input/output interface between the CPU and the parallel processing unit 802a. In an embodiment, the device driver is configured to implement the graphics processing pipeline 1400 utilizing the hardware of the parallel processing unit 802a.

Various programs may be executed within the parallel processing unit 802a in order to implement the various stages of the graphics processing pipeline 1400. For example, the device driver may launch a kernel on the parallel processing unit 802a to perform the vertex shading 1406 stage on one streaming multiprocessor 1100 (or multiple streaming multiprocessor 1100 modules). The device driver (or the initial kernel executed by the parallel processing unit 802a) may also launch other kernels on the parallel processing unit 802a to perform other stages of the graphics processing pipeline 1400, such as the geometry shading 1410 stage and the fragment shading 1416 stage. In addition, some of the stages of the graphics processing pipeline 1400 may be implemented on fixed unit hardware such as a rasterizer or a data assembler implemented within the parallel processing unit 802a. It will be appreciated that results from one kernel may be processed by one or more intervening fixed function hardware units before being processed by a subsequent kernel on a streaming multiprocessor 1100.

LISTING OF DRAWING ELEMENTS 300 circuit layout router
302 layout with device placement
304 genetic router
306 candidate routed layouts
308 reinforced learning model
310 DRC corrected routed layouts
312 final routed layout
400 incremental routing process
402 block
404 block
406 block
500 simulated annealing placement routine
502 block
504 block
506 block
508 block
600 genetic routing algorithm
700 reinforcement learning artificial neural network
702 convolution layers
704 state embedding
706 state value network
708 policy network
710 collected outputs
712 action mask
714 masked output
716 Softmax layer
718 action policies
720 pooling layer
722 vector
800 computing system
802a parallel processing unit
802b parallel processing unit
802c parallel processing unit
802d parallel processing unit
804 I/O unit
806 front-end unit
808 scheduler unit
810 work distribution unit
812 hub
814 crossbar
816 NVLink
818 interconnect
820 memory
900 general processing cluster
902 pipeline manager 904 pre-raster operations unit
906 raster engine
908 work distribution crossbar
910 memory management unit
912 data processing cluster
914 primitive engine
916 M-pipe controller
1000 memory partition unit
1002 raster operations unit
1004 level two cache
1006 memory interface
1100 streaming multiprocessor
1102 instruction cache
1104 scheduler unit
1106 register file
1108 core
1110 special function unit
1112 load/store unit
1114 interconnect network
1116 shared memory/L1 cache
1118 dispatch
1200 processing system
1202 central processing unit
1204 switch
1206 parallel processing module
1300 exemplary processing system
1302 communications bus
1304 main memory
1306 input devices
1308 display devices
1310 network interface
1400 graphics processing pipeline
1402 output data
1404 data assembly
1406 vertex shading
1408 primitive assembly
1410 geometry shading
1412 viewport SCC
1414 rasterization
1416 fragment shading
1418 raster operations
1420 input data Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A routing method for a circuit layout, the method comprising:
    executing a genetic routing algorithm to generate routes in the circuit layout;
    applying a reinforcement learning model to correct design rule constraint errors arising from the routes; and
    applying a number of uncorrected ones of the design rule constraint errors to evolve the chromosomes of a genetic routing algorithm.

2. The method of claim 1, further comprising:
    executing a simulated annealing algorithm to perform device placement in the circuit layout.

3. The method of claim 1, further comprising applying a number of unrouted terminal pairs to evolve the genetic routing algorithm.

4. The method of claim 1, wherein the reinforcement learning model comprises a convolutional neural network generating embeddings for at least one policy neural network and a state value neural network.

5. The method of claim 4, wherein the at least one policy neural network comprises a plurality of fully connected layers and an operation mask.

6. The method of claim 4, wherein the state value neural network comprises a plurality of fully connected layers.

7. The method of claim 1, further comprising:
    the reinforcement learning model receiving an image of a stick depiction of the circuit layout; and
    the reinforcement learning model transforming the image into action probabilities and a state value.

8. The method of claim 7, wherein the transformation into the action probabilities and the state values is invariant in relation to a width of the stick depiction.

9. The method of claim 1, wherein a fitness function for the genetic routing algorithm comprises a weighted sum of a number of unrouted terminal pairs in the routes and a number of the design rule constraint errors in the routes.

10. A system comprising:
    one or more processors; and
    logic that when applied to the one or more processors:
        operates a simulated annealing algorithm to perform device placement on a circuit layout;
        operates a genetic routing algorithm on the circuit layout to generate a plurality of candidate routed circuit layouts;
        operates a reinforced learning model to correct design rule constraint errors in the candidate routed circuit layouts; and
        applies feedback of a number of uncorrected ones of the design rule constraint errors in a fitness function to evolve chromosomes of the genetic routing algorithm.

11. The system of claim 10, wherein the design rule constraint errors are applied to a fitness function of the genetic routing algorithm.

12. The system of claim 11, wherein a number of unrouted terminal pairs is also applied to the fitness function of the genetic routing algorithm.

13. The system of claim 10, wherein the reinforcement learning model comprises a convolutional neural network generating embeddings for a plurality of policy neural networks and a state value neural network.

14. The system of claim 13, wherein the policy neural network comprises a plurality of fully connected layers and an operation mask.

15. The system of claim 13, further comprising:
    a pooling layer; and
    the state value neural network comprising a plurality of fully connected layers coupled to receive an output of the pooling layer.

16. The system of claim 10, the reinforcement learning model configured to:
    receive stick depiction images the candidate routed circuit layouts; and
    transform the stick depiction images into action probabilities for correcting the design rule constraint errors.

17. The system of claim 16, wherein the transformation into the action probabilities is invariant in relation to a width of the stick depiction images.

18. The system of claim 10, the genetic routing algorithm further comprising:
    a fitness function comprising a reciprocal of a weighted sum of a number of unrouted terminal pairs in the candidate routed circuit layouts and a number of the design rule constraint errors in the candidate routed circuit layouts.

* * * * *